United States Patent
Watts et al.

(10) Patent No.: US 8,254,538 B1
(45) Date of Patent: Aug. 28, 2012

(54) SCALABLE AND FLEXIBLE INTERNET FAX ARCHITECTURE FOR PROCESSING OUTBOUND FAX MESSAGES

(75) Inventors: Christian M. Watts, Aurora, CO (US); Edward D. Shephard, Golden, CO (US)

(73) Assignee: EC Data Systems, Inc., Englewood, CO (US)

( * ) Notice: Subject to any disclaimer, the term of this patent is extended or adjusted under 35 U.S.C. 154(b) by 0 days.

(21) Appl. No.: 13/405,614

(22) Filed: Feb. 27, 2012

(51) Int. Cl.
*H04M 11/00* (2006.01)
(52) U.S. Cl. .................. 379/100.01; 358/1.15
(58) Field of Classification Search ............. 379/100.01, 379/100.08, 100.09, 100.12, 100.13, 100.15; 358/400, 402, 407, 1.15
See application file for complete search history.

(56) References Cited

U.S. PATENT DOCUMENTS

| | | | | |
|---|---|---|---|---|
| 5,757,510 | A * | 5/1998 | Okada | 358/402 |
| 6,564,193 | B1 * | 5/2003 | Shore et al. | 705/400 |
| 7,653,185 | B2 * | 1/2010 | Rebert et al. | 379/100.01 |
| 2005/0063005 | A1 * | 3/2005 | Phillips et al. | 358/1.15 |
| 2009/0086278 | A1 * | 4/2009 | Vendrow et al. | 358/402 |

OTHER PUBLICATIONS

FAXAGE Internet FAX Service Completes Network Expansion. Dec. 28, 2007. http://www.free-press-release.com/news/200712/1198798649.html.
About FAXAGE. http://www.faxage.com/about.php.
FAXAGE. Email Fax Sending Guide. Jan. 11, 2012 16 pages. http://www.faxage.com/documentation/Email/FAXAGE-email-sending.pdf.
FAXAGE. User's Guide. Jan. 11, 2012. 66 pages. http://www.faxage.com/documentation/UserGuide/FAXAGE_User_Guide.pdf.
FAXAGE. Internet Fax API Documentation. Jul. 22, 2011. 35 pages. http://www.faxage.com/documentation/API/Internet-Fax-API-Documentation-FAXAGE.pdf.

* cited by examiner

*Primary Examiner* — Stella Woo
(74) *Attorney, Agent, or Firm* — Hamilton, DeSanctis & Cha LLP

(57) ABSTRACT

Methods and systems for processing outbound fax messages in an efficient and scalable manner are provided. According to one embodiment, an Internet fax system receives a request to deliver a fax message. Source files representing content to be included as part of the fax message are stored to a shared storage area accessible by imaging systems and fax processing resources. An imaging system is selected to convert the source files into a digital representation suitable for faxing. A work request identifying the selected imaging system is stored on a centralized work queue within a database. The imaging systems poll the centralized work queue to retrieve pending work requests. Responsive to identifying the work request, the selected imaging system converts the source files, associates the resulting digital representation with an outbound fax job and causes the fax message to be delivered by submitting the outbound fax job to a fax modem.

16 Claims, 16 Drawing Sheets

SCALABLE AND FLEXIBLE INTERNET FAX ARCHITECTURE FOR PROCESSING OUTBOUND FAX MESSAGES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2012, EC Data Systems Inc.

BACKGROUND

1. Field

Embodiments of the present invention generally relate to receiving documents via email, website and/or custom application programming interface (API) integration, creating corresponding outbound fax jobs and transmitting the outbound fax jobs to the specified destinations. In particular, embodiments of the present invention relate to an improved Internet fax architecture designed for scalability, flexibility and efficient outbound facsimile processing that, among other things, implements a centralized message/work queue within a database, an imaging system load-notification system, a fair queuing system to ensure subscribers have equal access to imaging systems, an outbound resource selection algorithm based on the customer's subscribed capacity and a mass fax interface capability.

2. Description of the Related Art

Existing Internet fax systems have numerous limitations in terms of the scalability and flexibility of their architectures and user-facing flexibility. Existing Internet fax systems have no mechanism to identify image processing resources that are most capable of processing new work and instead rely on a simplistic first-in-first-out (FIFO) methodology to assign outgoing fax requests. While such a FIFO approach is easy to implement, it sacrifices efficiency in connection with image processing resource utilization and can create bottlenecks in outbound fax processing.

Furthermore, the user-facing inflexibility exhibited by existing Internet fax systems results in part from an underlying assumption that a single outbound fax job is associated with a single destination. As such, when a single fax containing the same content is desired to be sent to multiple destinations, customers must submit the fax to the Internet fax system for each destination.

In view of the foregoing and numerous other limitations associated with existing Internet fax systems, a more efficient and flexible architecture that better suits the needs of corporate users is needed.

SUMMARY

Methods and systems are described for processing outbound fax messages in an efficient and scalable manner. According to one embodiment, an initial submission device of an Internet fax system receives a request to deliver a fax message. Source files associated with the request and representing at least a portion of content to be included as part of the fax message are stored to a shared storage area accessible by imaging systems and fax processing resources of the Internet fax system. An imaging system is selected to convert the source files into a digital representation suitable for faxing. A work request is stored on a centralized work queue within a database accessible by the imaging systems. The work request contains information identifying the selected imaging system. The imaging systems poll the centralized work queue to identify whether any pending work requests exist for them. Responsive to identifying the work request, the selected imaging system converts the source files, associates the resulting digital representation with an outbound fax job and causes the fax message to be delivered by submitting the outbound fax job to a fax modem.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
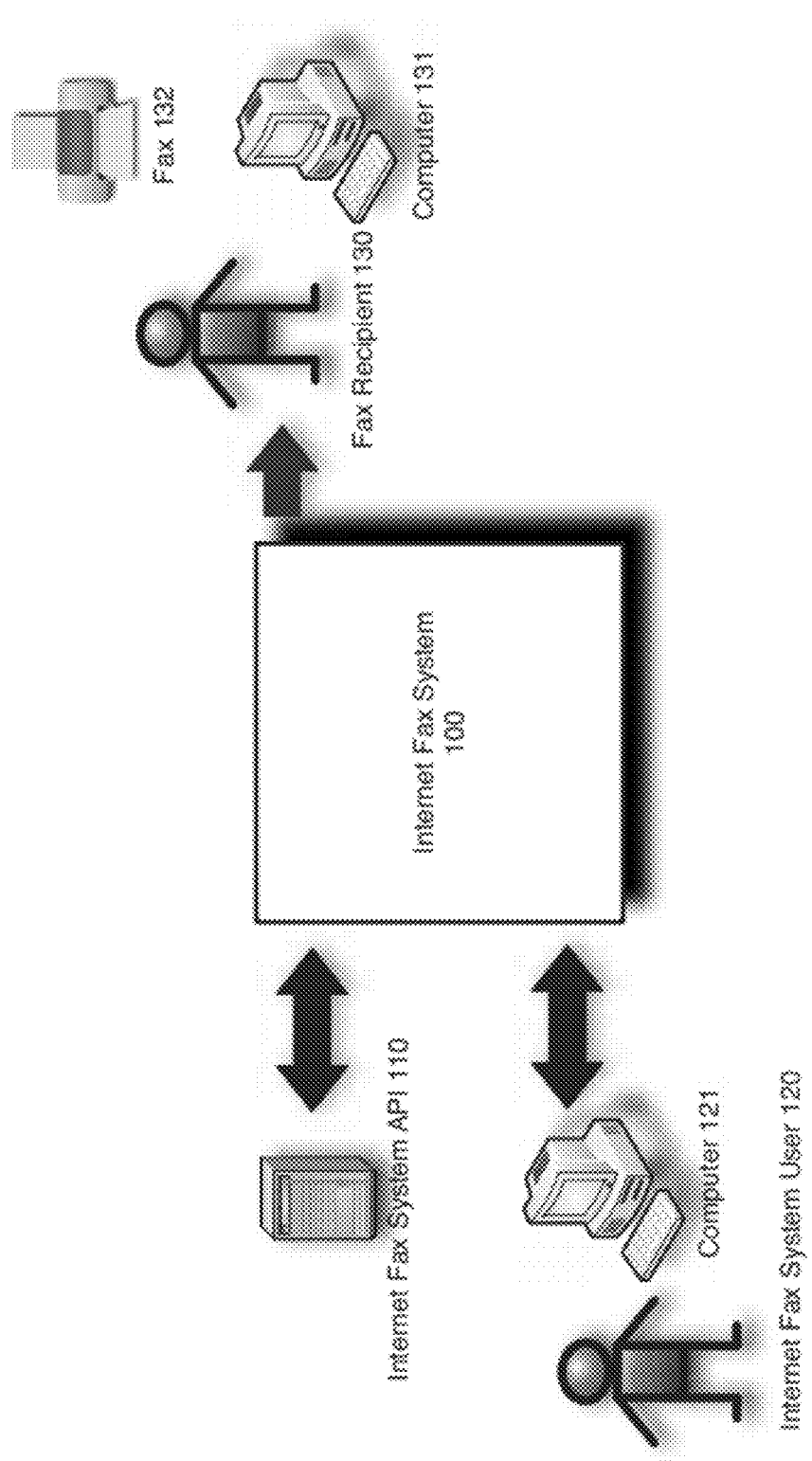
FIG. 1 is a context level diagram illustrating external actors that may interact with an Internet fax system in accordance with an embodiment of the present invention.

Methods and systems are described for processing outbound fax messages in an efficient and scalable manner.

According to embodiments of the present invention, an improved Internet fax architecture is provided that is designed for scalability, flexibility and efficient outbound facsimile processing that, among other things, implements a centralized message queue within a database, an imaging system load-notification system, a fair queuing system to ensure subscribers have equal access to imaging systems, an outbound resource selection algorithm based on the customer's subscribed capacity and a mass fax interface capability.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

For simplicity and sake of brevity, various embodiments described herein focus on outbound fax processing and delivery of received documents in the form of fax messages to one or more destinations specified by subscribers; however, it is to be noted that the Internet fax system may also be capable of facilitating receipt of inbound fax messages on behalf of subscribers as well.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling.

The phrases "facsimile call" or "fax call" generally refer to a call carried over a circuit-switched network (e.g., the public switched telephone network (PSTN)) or a VoIP call carried over a packet-switched network (e.g., the Internet) from a device intending to transmit a facsimile to a particular destination phone number.

The phrases "facsimile processing resource" and "fax processing resource" generally refer to a device capable of making a facsimile call, establishing a facsimile protocol communication with the destination and transmitting facsimile data to the destination phone number. A non-limiting example of a facsimile processing resource is a fax server or a subset of resources associated with a fax server.

The phrases "facsimile signal" or "fax signal" generally refer to a digital representation of audio information encoding a facsimile message. According to embodiments of the present invention, outbound fax signals may be transmitted over a circuit-switched network (e.g., the public telephone network) or a packet-switched network (e.g., the Internet via Voice over Internet Protocol (VoIP)).

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a context level diagram illustrating external actors that may interact with an Internet fax system in accordance with an embodiment of the present invention. In embodiments of the present invention, Internet fax system 100 allows users associated with a subscriber account to send fax messages without necessarily owning a fax machine via a web site, email to fax and/or application programming interface (API) fax methods. Embodiments of the present invention support a multi-user system where the subscriber may be, but is not assumed to be an individual user and is typically an organization having 1 to n users.

Each subscriber account may have one or more users and one or more associated fax numbers. According to one embodiment, flexible configuration settings allow do not fax settings, image resolution settings, notification settings, caller ID settings, tagline settings, time zone settings and retry settings at a subscriber, user or job-level as appropriate. For purposes of efficiency, defaults may be established at an account level and overridden, if desired, at the user level. For example, all outbound faxes from a particular subscriber may be configured to include a particular tagline, use a certain time zone when printing the date/time in the tagline and perform a particular number of retries. Meanwhile, users at different geographical locations may override the time zone setting and/or number of retries. Similarly, by default all faxes transmitted by a subscribing enterprise may be configured to image the tagged image file format (TIFF) outbound fax job at a certain resolution on a per-account basis (e.g., fine, hyperfine, low/normal); however, a particular user may override the default based on his/her personal tradeoff preferences between cost/time-to-transmit and quality of the image as transmitted.

Internet fax system 100 receives and processes requests to deliver outbound fax message from an Internet fax system application programming interface (API) 110 and/or users associated with subscribers, e.g., Internet fax system user 120 (via an email or web interface), and delivers fax messages to one or more destination phone numbers associated with desired recipients, e.g., fax recipient 130. Anyone with a fax machine (subscriber or non-subscriber) can receive faxes originated by Internet fax system user 120. As described further below, embodiments of the present invention also allow for fax delivery requests and data store queries to be made via an API over Hypertext Transport Protocol (HTTP) or HTTP secure (HTTPS) that allows programmers to build fax transmission capabilities into their applications.

According to the present example, Internet fax system 100 interfaces with Internet fax system APIs, such as Internet fax system API 110, Internet fax system users associated with a subscriber account, such as Internet fax system user 120, and fax recipients, such as fax recipient 130.

Internet fax system user 120 may communicate requests to deliver outbound fax messages directed to one or more fax numbers via any Internet connected device, such as computer 121, a smartphone (not shown) or the like. As described further below, Internet fax system user 120 may provide content to be faxed in a variety of forms, including email attachments in the form of standard business documents (e.g., Microsoft Word, PDF, etc.), links to web content and inline email content (e.g., text, HTML and/or embedded images).

Fax recipient 130 may receive faxes from subscribers of Internet fax system 100 via a dedicated fax machine 132, computer 131, multifunction/all-in-one printer (not shown) or other fax-capable device (not shown) just as he/she would receive faxes from non-subscribers. Fax recipient 130 may, but need not be a subscriber of Internet fax system 100 to receive faxes from a subscriber, such as Internet fax system user 120. If fax recipient 130 is a subscriber, then he/she may receive faxes as email attachments, as secure download links embedded within email messages or download them from a web site associated with Internet fax system 100 as described in copending U.S. patent application Ser. No. 13/346,456, which is hereby incorporated by reference in its entirety for all purposes.

Internet fax system API 110 may represent a standardized API associated with Internet fax system 100 or a custom API developed to API specifications established by the owner/operator of Internet fax system 100. Internet fax system API 110 may provide capabilities that an application programmer can use to integrate fax capabilities into their applications utilizing Internet fax system 100 as a backend, for example. In one embodiment, the integration is accomplished via HTTP or HTTPS POST operations.

Depending upon the particular implementation, Internet fax system API 110 may provide operations to support fax sending and receiving, call detail record collection and automated number provisioning and de-provisioning. Additional details regarding an exemplary set of operations and related variables for an Internet fax system API are described in the Appendix.

Figure 2:
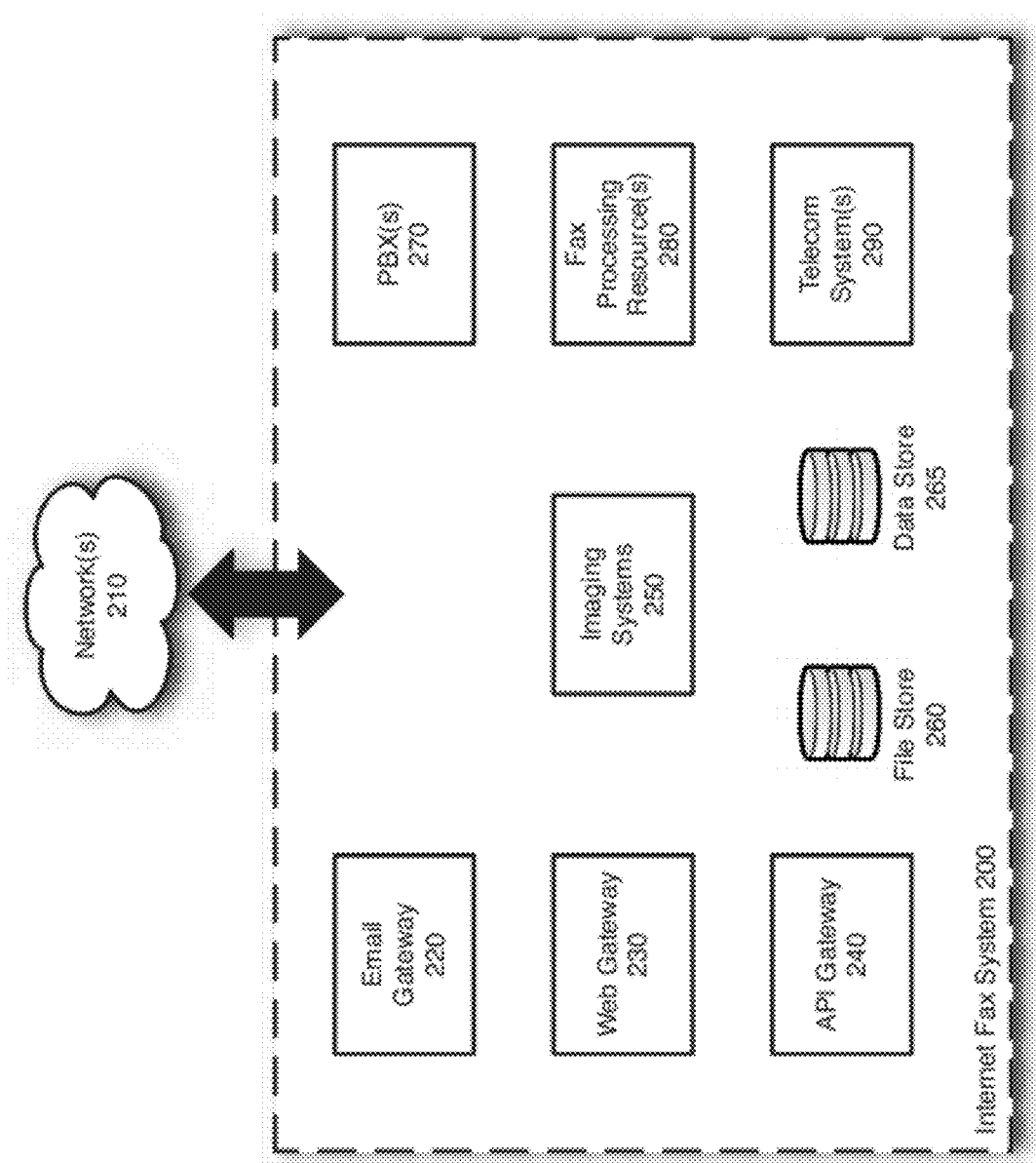
FIG. 2 is a system level block diagram conceptually illustrating an architecture of an Internet fax system in accordance with an embodiment of the present invention.

FIG. 2 is a system level block diagram conceptually illustrating an architecture of an Internet fax system in accordance with an embodiment of the present invention. According to the present example, Internet fax system 200 is coupled to one or more networks 210 (e.g., a packet-switched network, such as the Internet, and a circuit-switched network, such as the public switched telephone network (PSTN)) through which requests to deliver outbound fax messages may be received and through which outbound faxes may be delivered.

In the exemplary simplified architecture depicted, Internet fax system 200 includes an email gateway 220, a Web gateway 230, an API gateway 240, multiple imaging systems 250, a file store 260, a data store 265, one or more private branch exchanges (PBXs) 270, multiple fax processing resources 280 and one or more telecommunications systems 290 interconnected via an appropriate telecommunications signaling network and an Internet Protocol (IP) network.

According to one embodiment, email gateway 220 is operable to receive requests to deliver outbound fax messages from subscribers. Responsive to receipt of an email message email gateway 220 may parse the email to determine the sender, the destination(s) and other optional parameters. In one embodiment, the email request may include one or more attachments representing the content of the desired outbound fax message. In such an embodiment, email gateway 220 may strip the attachment(s) from the email message and store the attachment(s) in file store 260. As described further below, email gateway 220 may also determine the sender based upon the email message and extract information regarding the destination(s) and other parameters and store this information in data store 265. According to one embodiment, if a system generated cover sheet is set up, email gateway 220 may also generate and store a cover sheet as another file for the fax job in the file store 260 and data store 265. Once the fax content is ready to be processed, email gateway 220 may store a work request in a centralized message/work queue (not shown) implemented within a database, such as data store 265. In some embodiments, rather than implementing a simplistic FIFO mechanism as described by U.S. Pat. No. 6,597,688 and its progeny, a novel imaging system selection process is employed by email gateway 220 to identify a least loaded imaging system of imaging systems 250 to process the fax content (e.g., convert to TIFF format, transform landscape to portrait, print HTML source to a PDF, etc.). According to one embodiment, after an appropriate imaging system has been selected to process the fax content, email gateway 220 assigns a corresponding work request to the selected imaging system by placing a work request in the centralized message/work queue within data store 265, for example, where the work request contains information identifying the selected imaging system that should process the fax content.

In one embodiment, the work request includes the following information:
Hostname—the hostname of the selected imaging system
Jobid—the unique job ID associated with the request in the application-level database (e.g., data store 265)
Callerid—caller ID requested, if different than the default
Orgid—the unique id associated with the subscriber account Web gateway 230 is operable to receive and process user requests relating to outbound faxes. For example, responsive to a user logging into a web site (not shown) associated with Internet fax system 200 and navigating to the transmit faxes page, the web site may present the user with an interface to specify one or more destinations, upload document(s) to send, create a cover sheet and specify other optional parameters. After the information regarding the outbound fax delivery request has been gathered from the user, web gateway 230 stores the document(s) to be faxed in file store 260, stores sender, destination(s) and any other parameters in data store 265 and stores a work request in the centralized message/work queue. In some embodiments, web gateway 230 may also perform the imaging system selection process to identify a least loaded imaging system of imaging systems 250 to process the fax content. According to one embodiment, after an appropriate imaging system has been selected to process the fax content, web gateway 230 assigns the work request to the selected imaging system as described above by placing the work request in the centralized message/work queue and including therein information identifying the selected imaging system (e.g., the hostname of the selected imaging system) that should process the fax content.

API gateway 240 supports API-based receipt of requests to deliver outbound fax messages, wherein the interaction can be with a program on a user system. In this manner, API gateway 240 provides an alternative to manual uploading of fax messages in contrast to existing Internet fax systems, such as that described in U.S. Pat. No. 6,597,688 and its progeny. As described in further detail below, API gateway 240 processes API information to determine the sender, destination(s) and other optional parameters associated with requests to deliver outbound fax messages. As indicated above with respect to email gateway 220 and web gateway 230, after the information regarding the outbound fax delivery request has been gathered, API gateway 240 stores the document(s) to be faxed in file store 260, stores sender, destination(s) and any other parameters in data store 265 and stores a work request in the centralized message/work queue. In some embodiments, API gateway 240 may also perform the imaging system selection process to identify a least loaded imaging system of imaging systems 250 to process the fax content. According to one embodiment, after an appropriate imaging system has been selected to process the fax content, API gateway 240 assigns the work request to the selected imaging system as described above by placing the work request in the centralized message/work queue and including therein information identifying the selected imaging system (e.g., the hostname of the selected imaging system) that should process the fax content. Further details regarding an exemplary set of operations that may be automated via API gateway 240 are provided in the attached Appendix.

According to one embodiment, imaging systems 250 implement a load-notification system in which each imaging system periodically sends load information to an image queue database within data store 265, for example. As described in further detail below, the initial submission device (e.g., email gateway 220, web gateway 230 or API gateway 240) runs an imaging system selection process to select an appropriate imaging system of imaging systems 250 based on the load information reported by the imaging systems 250.

File store 280 represents a shared storage resource accessible by the initial submission device (e.g., email gateway 220, web gateway 230 or API gateway 240), imaging systems 250 and fax processing resources 280 for storing and accessing fax content in its source format and the corresponding digital representations of fax messages based thereon. According to one embodiment, file store 260 is simply a disk with no processing other than storage access logic. According to one embodiment, file store 260 is a database implemented within a network attached storage (NAS) device, such as a NetApp NAS filer available from NetApp, Inc.

In one embodiment, data store 265 includes a centralized message/work queue database for storing work requests for imaging systems 250 and a separate application-level database that is operable to store information specific to fax jobs (e.g., destination number(s), location(s) of file(s) that comprise the fax job, source user, user account configuration, etc.). Data store 265 may also represent storage for accounting, billing, features and other metadata associated with outbound fax messages. According to one embodiment, data store 265 is a Solaris x86-based workstation running an open source database, such as MySQL.

Embodiments of the present invention seek to provide redundancy and scalability based on an active-0/active-n setup of multiple fax processing resources, PBXs, etc. that are all essentially identical, such that a given fax processing resource does not have to be associated with a "backup" fax processing resource that is used if it goes down as suggested by prior Internet fax system architectures, such as the architecture described in U.S. Pat. No. 6,208,638. Instead, in accordance with embodiments of the present invention, an n-way pool of possible fax servers and modems, for example, are available for use.

Fax processing resources 280 are operable to accept outbound fax jobs from imaging systems 250. According to one embodiment fax processing resources send the fax jobs to the destination(s) with automatic retries and other customer-specified parameters. Fax processing resources 280 may include one or more digital access cross connects (DACS) (not shown) and one or more fax servers (not shown), each of which may include one or more analog fax modems, digital fax boards and/or soft modems (modems implemented in software). According to one embodiment, fax servers each have 24 ports and those ports are connected to the 24 ports of a single DACS. Those of ordinary skill in the art will appreciate there are a variety of possible combinations of DACS to fax server connections/configurations. For example, in alternative configurations, each DACS may support multiple fax servers—theoretically as many fax servers as it has ports by connecting each port of the DACS to a single port of a fax server. According to one embodiment, fax servers include Linux servers running open source fax server software, such as HylaFAX. According to one embodiment, DACS provide DS1/DS0 (0/1) cross-connect functionality and may be one of Adtran's ATLAS series of enterprise integrated access devices, such as the ATLAS 550 series, ATLAS 800 series, Tellabs Titan series DACS or the like.

According to one embodiment, one or more PBXs 270 are logically interposed between fax processing resources 280 and telecom system(s) 290. The PBX(s) 270 are operable to accept outgoing calls initiated by fax processing resources 280, determine an appropriate route for such calls, dial the appropriate route and bridge the call to the fax processing resource. At call completion, the PBX(s) 270 record telephony (Integrated Services Digital Network (ISDN)) information and call accounting information in data store 265 for billing. PBXs 270 may be implemented by installing and running an open source PBX software package on a server. For example, a non-limiting example of a suitable PBX is a Linux server running Asterisk. Alternatively, PBXs available from Cisco or Avaya may be used.

According to one embodiment, telecommunications system(s) 290 are operable to accept outgoing fax calls and select an appropriate trunk group (amongst multiple connected circuit and packet connections) based on information received from PBX(s) 270. Telecommunications system(s) 290 dial the outgoing fax call on the appropriate trunk group and upon call completion, record telephony (ISDN), switch, accounting and technical information in data store (via RADIUS) for troubleshooting and debugging purposes. In one embodiment, telecommunications system(s) 290 include one or more switches (not shown), which may be connected to the Internet via Ethernet and connected to the PSTN via dedicated, high bandwidth circuits (e.g., DS3 and/or DS1 lines). In one embodiment, switches are high-capacity access servers providing both packet and time-division multiplexing (TDM) switching. Examples of suitable switches include, but are not limited to, the Cisco AS5850 Universal Gateway, the Cisco AS5800 Access Server, the Cisco AS5400 Universal Gateway, the Cisco AS5350 Universal Gateway and the Cisco AS5300 Universal Access Server. Depending upon the particular implementation, telecommunications system(s) 290 may comprise a single switch or multiple redundant switches in which one of the switches is an active primary switch and the others are active standby switches, which can take over for the primary in the event of a failure. In alternative embodiments, it is also possible to have an active/active redundant switch architecture in which multiple circuits from PSTN and/or Internet provide the same services and the circuits are split between multiple switches that are interconnected in a mesh for redundancy and/or increased capacity.

Figure 3:
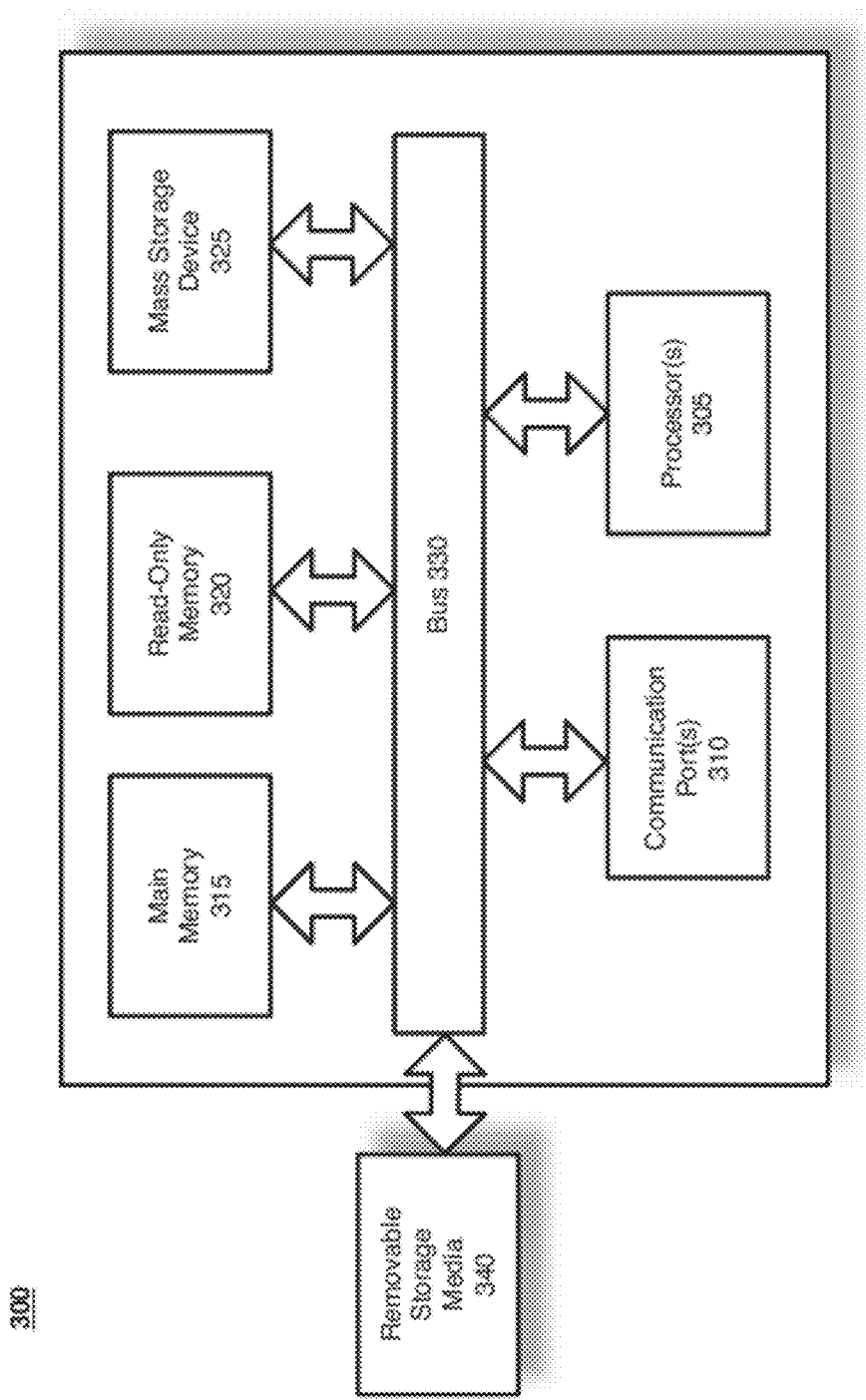
FIG. 3 is an example of a computer system with which embodiments of the present invention may be utilized.

FIG. 3 is an example of a computer system with which embodiments of the present invention may be utilized. Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 3 is an example of a computer system 300, such as a Linux-based fax server, a Linux-based PBX, a Solaris x86 database server or the like, upon which or with which embodiments of the present invention may be employed.

According to the present example, the computer system includes a bus 330, one or more processors 305, one or more communication ports 310, a main memory 315, a removable storage media 340, a read only memory 320 and a mass storage 325.

Processor(s) 305 can be any future or existing processor, including, but not limited to, an Intel® Itanium® or Itanium 2 processor(s), or AMD®, Opteron® or Athlon MP® processor(s), or Motorola® lines of processors. Communication port(s) 310 can be any of an RS-232 port for use with a modem based dialup connection, a 10/100 Ethernet port, a Gigabit port using copper or fiber or other existing or future ports. Communication port(s) 310 may be chosen depending on a network, such as a Local Area Network (LAN), Wide Area Network (WAN), or any other network to which the computer system 300 connects. For example, in the context of a PBX, communication port(s) 310 may include communication cards supporting Ethernet or DS1/DS3 types of connections and in the context of a fax server, communication port(s) 310 may include Ethernet, DS0, T1/DS1 (such as ISDN Primary Rate Interface (PRI)) or fractional T1/DS1 or digital DS0 (such as ISDN Basic Rate Interface (BRI)).

Main memory 315 can be Random Access Memory (RAM), or any other dynamic storage device(s) commonly known in the art. Read only memory 320 can be any static storage device(s) such as Programmable Read Only Memory (PROM) chips for storing static information such as start-up or BIOS instructions for processor 305.

Mass storage 325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 330 communicatively couples processor(s) 305 with the other memory, storage and communication blocks. Bus 330 can include a bus, such as a Peripheral Component Interconnect (PCI)/PCI Extended (PCI-X), Small Computer System Interface (SCSI), USB or the like, for connecting expansion cards, drives and other subsystems as well as other buses, such as front side bus (FSB), which connects the processor(s) 305 to system memory.

Optionally, operator and administrative interfaces, such as a display, keyboard, and a cursor control device, may also be coupled to bus 330 to support direct operator interaction with computer system 300. Other operator and administrative interfaces can be provided through network connections connected through communication ports 310.

Removable storage media 340 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

In some embodiments, a computer system, such as computer system 300, is configured to operate as one or more of PBXs. For example, as described above, any or all of PBX(s) 270 may be implemented as a Linux server running an open source PBX software package, such as Asterisk. In some embodiments, a computer system, such as computer system 300, is configured to operate as one or more fax servers. For example, as described above, any or all of fax processing resource(s) 280 may be implemented as a Linux server running open source fax server software, such as HylaFAX. In some embodiments, a computer system, such as computer system 300, runs multiple virtual machines each of which represents an imaging system of imaging systems 250. In some embodiments, a computer system, such as computer system 300, is configured to support one or more databases, such as a billing database and/or data store 265 including a centralized message/work queue accessible by the gateway systems (e.g., email gateway 220, web gateway 230 and API gateway 240) and imaging systems 250. For example, as described above, any or all of the databases described herein may be implemented within a Solaris x86-based workstation running an open source database, such as MySQL. As those of ordinary skill in the art will appreciate, the computer system components described above are meant only to exemplify various possibilities. In no way should the aforementioned exemplary computer system limit the scope of the invention.

Figure 4:
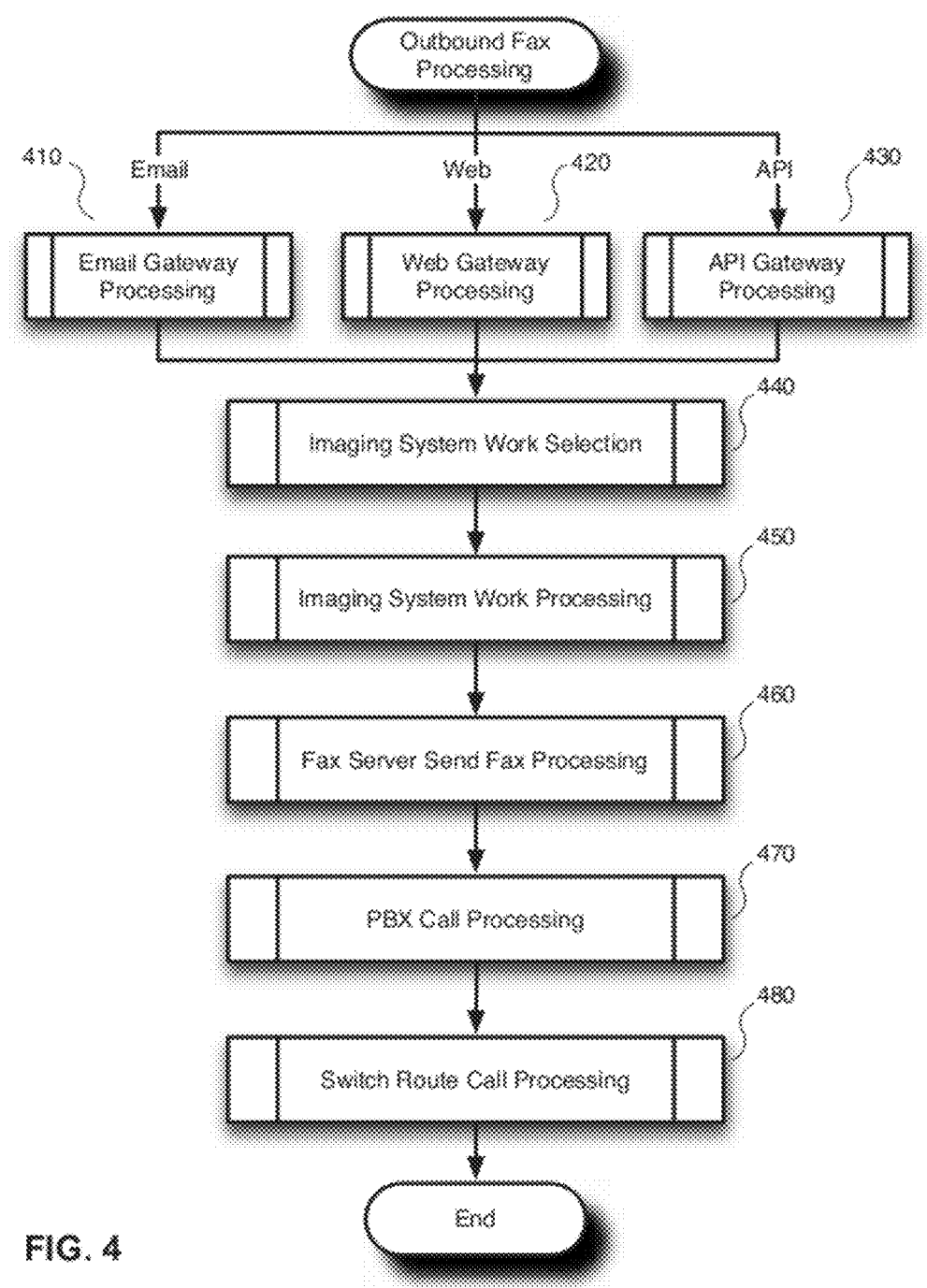
FIG. 4 is a high-level flowchart illustrating outbound fax processing in accordance with an embodiment of the present invention.

FIG. 4 is a high-level flowchart conceptually illustrating outbound fax processing in accordance with an embodiment of the present invention. According to the present example, a request to deliver an outbound fax message can be received via email, web or API. If the request is received via email, then outbound fax processing continues with block 410 in which email gateway processing is performed. According to one embodiment, email gateway processing is as described with reference to FIG. 5.

If the request is received via web, then outbound fax processing continues with block 420 in which web gateway processing is performed. According to one embodiment, web gateway processing is as described with reference to FIG. 6.

Otherwise, if the request is received via API, then outbound fax processing continues with block 430 in which API gateway processing is performed. According to one embodiment, API gateway processing is as described with reference to FIG. 7.

As the initial submission devices (e.g., email gateway 220, web gateway 230 or API gateway 240) process requests to deliver outbound fax messages and create corresponding work requests for selected imaging systems of imaging systems 250, imaging system work selection is performed by each imaging system at block 440 to identify appropriate work requests. According to one embodiment, imaging system work selection is as described with reference to FIG. 9.

After an imaging system identifies appropriate work request(s), at block 450, imaging system work processing is performed. According to one embodiment, imaging system work processing is as described with reference to FIG. 11.

After the imaging system has completed its processing and has submitted the corresponding fax job to a fax server, at block 460, fax server send fax processing is performed. According to one embodiment, fax server send fax processing is as described with reference to FIG. 12.

Responsive to fax server send fax processing, PBX call processing is initiated at block 470. According to one embodiment, PBX call processing is as described with reference to FIG. 13.

Responsive to PBX call processing, switch route call processing is initiated at block 480. According to one embodiment, switch route call processing is as described with reference to FIG. 14. After switch route call processing is terminated, outbound fax processing is complete.

Figure 5:
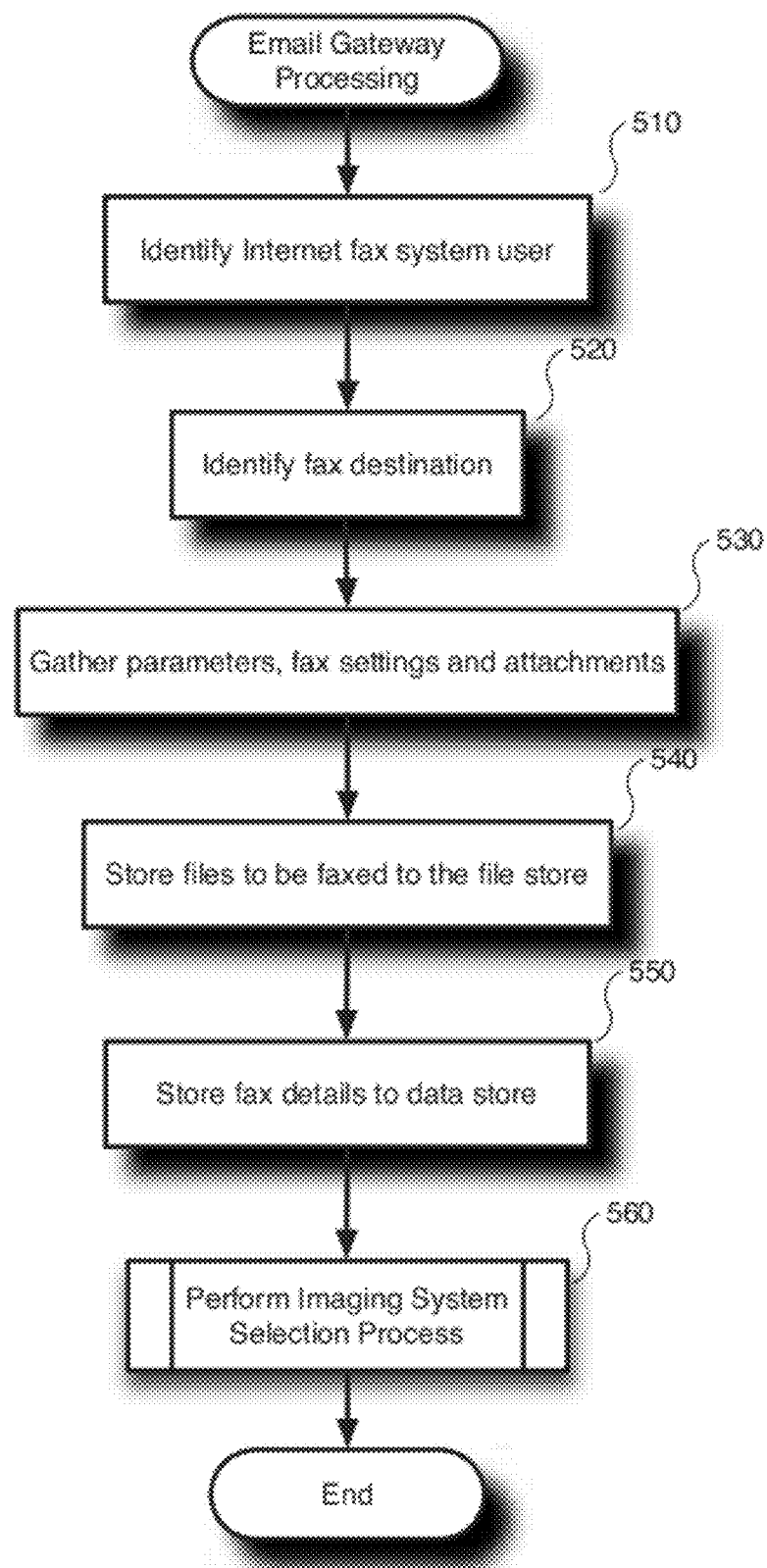
FIG. 5 is a flowchart illustrating email gateway processing in accordance with an embodiment of the present invention.

FIG. 5 is a flowchart illustrating email gateway processing in accordance with an embodiment of the present invention. At block 510, the Internet fax system user is identified. According to one embodiment, information may be gathered regarding the sender of the email request from the Return-Path and/or from other email headers associated with the email request. Based on the identity of the sender of the email request, subscriber account information may be queried from a subscriber database to determine whether the sender is a valid user on an active subscriber account. If not, then a return email may be generated and transmitted to the sender indicating the error and email gateway processing may terminate. If the sender is confirmed to be a valid user of an active subscriber account, then email gateway processing continues with block 520.

At block 520, the fax destination is identified. In one embodiment, Internet fax system users may direct faxes to a desired fax destination by directing the email to a domain owned by the Internet fax system and specifying the desired fax destination in the local-part of the email address (e.g., 3035551212@faxage.com). In such an embodiment, the fax destination may be identified by extracting the local-part of the email address in the "To" header of the email request. In alternative embodiments, various other conventions may be used to convey the desired fax destination. For example, the fax destination may be identified as such (via a labeling or tagging convention) in the body of the email request or in the subject line. Those skilled in the art will recognize numerous other alternatives. If a valid destination is not found associated with the email request, then a return email may be generated and transmitted to the Internet fax system user identifying the error (e.g., "no valid fax destination") and email gateway processing may terminate. If a valid fax destination is identified, then email gateway processing continues with block 530.

At block 530, parameters, fax settings and attachments are gathered. In one embodiment, optional parameters, such as priority (low or high), destination name and whether to include text and HTML attachment types on a one-off basis, may be identified in the email request. As indicated above, various conventions may be used to convey values of parameters, including, but not limited to, providing a list of name-value pairs, in the body of the email request or in the subject line. Other default or custom fax settings may be stored in a subscriber database. For example, email fax settings for the subscriber account may specify whether a system-generated cover sheet is to be used, types of email attachments that are enabled and whether to store the subject line for later return. Having identified the types of permissible email attachments, the email gateway can proceed to gather attachments, if any, according to valid types. In one embodiment, the email body itself can serve as a valid email "attachment." If no valid email attachments are found, then a return email may be generated and transmitted to the Internet fax system user identifying the error (e.g., "no attachments to fax email") and email gateway processing may terminate. If one or more valid email attachments are found, then email gateway processing continues with block 540.

At block 540, copies of files to be faxed are stored in file store 260, for example. In addition to any valid email attachments associated with the email request, the files stored may include a cover sheet as the first file to be faxed if a cover sheet is to be generated.

At block 550, fax details are stored to data store 265, for example. Fax details may include one or more of the following:

Sending user ID
Sending Account ID
Destination
Locations of files to fax
Optional parameters
Original subject line In one embodiment, responsive to the fax details storage request, data store 265 returns to email gateway 220 a unique ID (e.g., a job ID of 1 to n digits) to be associated with this particular outbound fax job. According to one embodiment, the job ID is based on an auto-incremented unique primary key.

At block 560, an imaging system selection process is performed. According to one embodiment, imaging system selection processing is as described with reference to FIG. 8.

Figure 6:
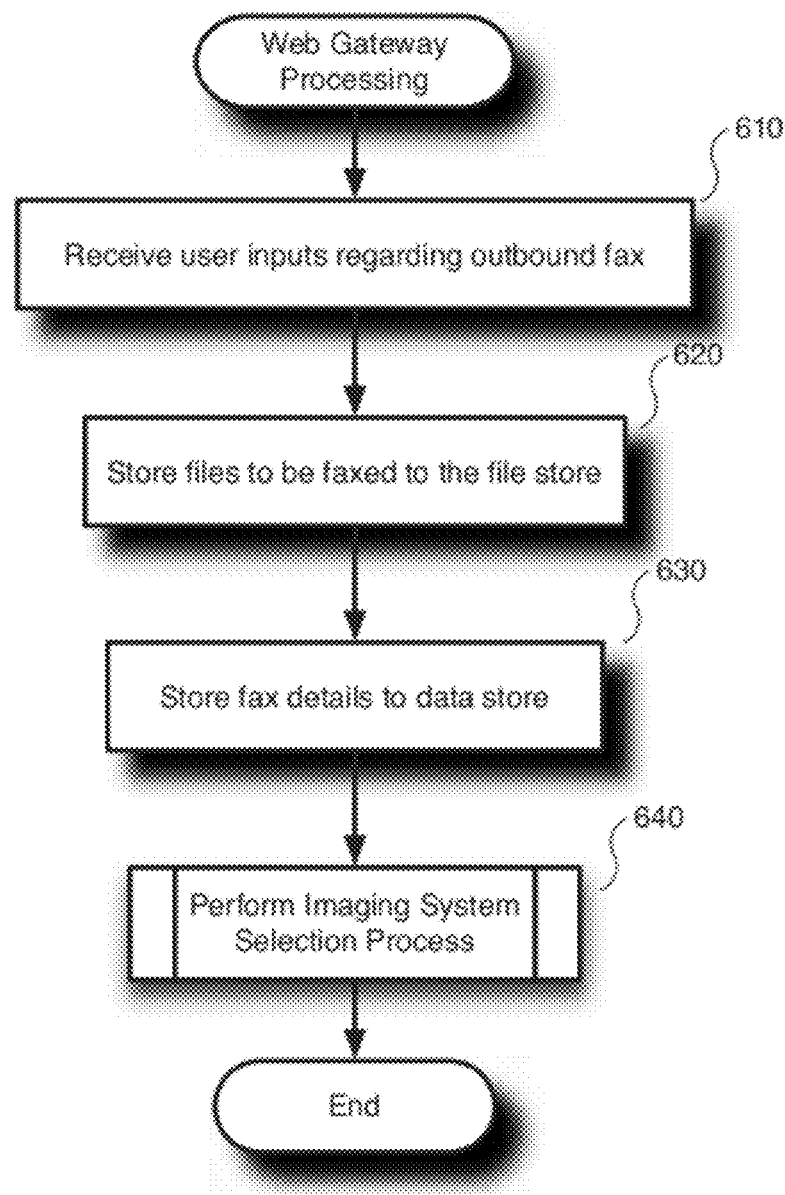
FIG. 6 is a flowchart illustrating web gateway processing in accordance with an embodiment of the present invention.

FIG. 6 is a flowchart illustrating web gateway processing in accordance with an embodiment of the present invention. At block 610, a user inputs regarding an outbound fax are received. Typically, the user would first login by providing login credentials (e.g., a username and a password) via a subscriber login page of a website associated with the Internet fax system. Responsive to receipt of the login credentials, web gateway 230 queries a subscriber database to verify whether the login credentials correspond to a valid user on an active subscriber account. If not, then an error message may be returned identifying the error (e.g., "login incorrect") and web gateway processing may terminate. If the login credentials correspond to a valid user on an active subscriber account, then web gateway processing continues (potentially after receiving one or more intermediate navigation requests from the user ultimately indicating a desire to transmit a fax) by presenting one or more HTML screens to the user to collect information associated with the desired outbound fax. Information collected may include a destination name and number, priority (low or high), from 1 to n locations of content to be transmitted (e.g., paths of 1 to n files on the user's computer system, URLs or the like), a location of a file representing an optional cover sheet and an indication of whether the user would like to be notified by email when the fax transmission has completed. According to one embodiment, after the files representing the content to be transmitted have been uploaded to the Internet fax system, the user is given an opportunity to fill out a cover sheet form, which causes the system to generate the cover sheet file. Processing then continues with block 620.

At block 620, the files to be faxed are stored in file store 260, for example. In addition to the file(s) representing the content of the desired fax, the files stored may include an optional cover sheet as the first file to be faxed if a cover sheet is to be generated.

At block 630, fax details are stored to data store 265, for example. Fax details may include one or more of the following:
Sending user ID
Sending Account ID
Destination
Locations of files to fax In one embodiment, responsive to the fax details storage request, data store 265 returns to web gateway 230 a unique ID (e.g., a job ID of 1 to n digits) to be associated with this particular outbound fax job. As described above with respect to email gateway processing, the job ID may be based on an auto-incremented unique primary key.

At block 640, an imaging system selection process is performed. According to one embodiment, imaging system selection processing is as described with reference to FIG. 8.

Figure 7:
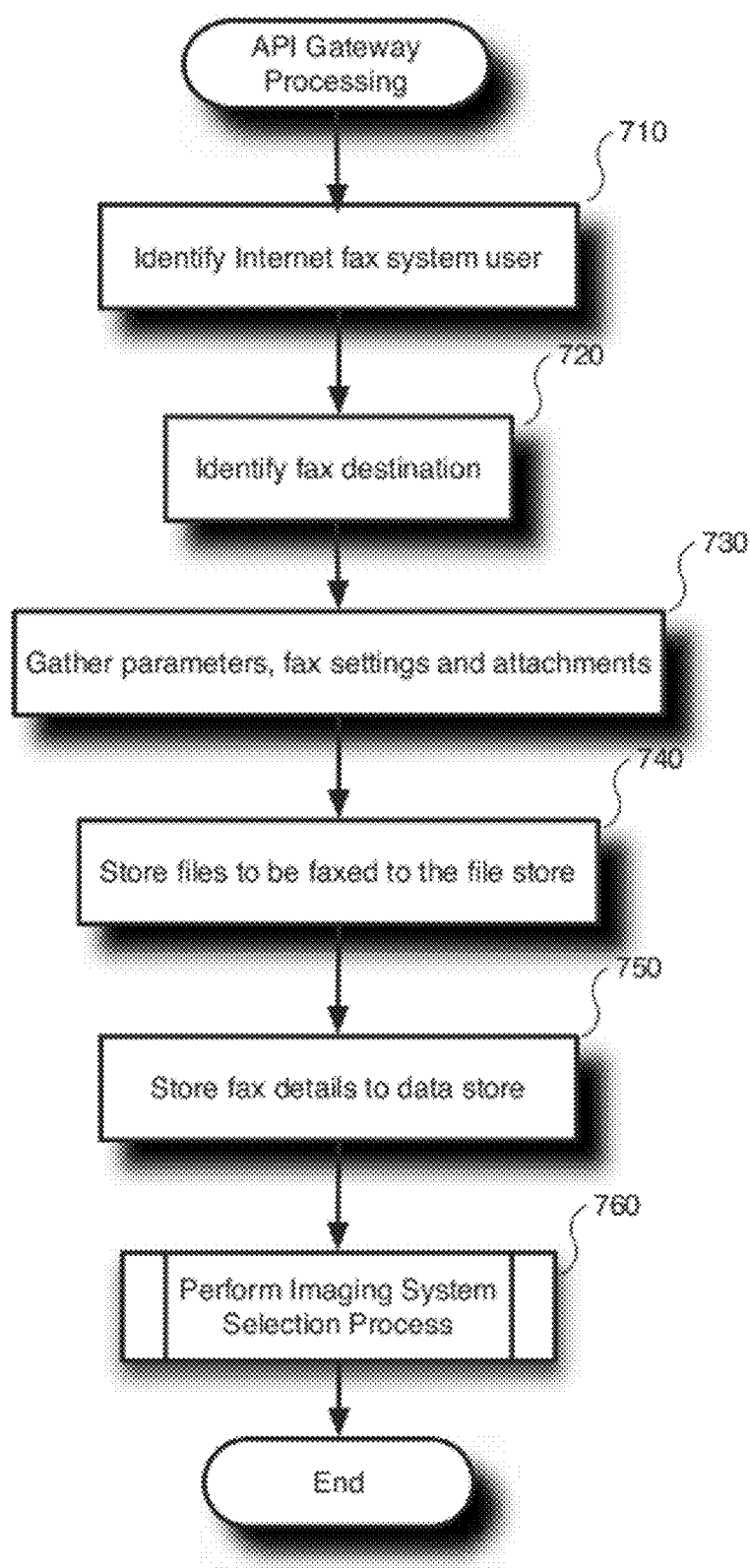
FIG. 7 is a flowchart illustrating web services processing in accordance with an embodiment of the present invention.

FIG. 7 is a flowchart illustrating web services processing in accordance with an embodiment of the present invention. At block 710, responsive to receipt of an HTTP or HTTPS POST, API gateway 240 identifies the Internet fax system user making the request. According to one embodiment, credentials are gathered from the POST and a subscriber database is queried to determine whether the request is from a valid user on an active subscriber account. If not, then an error message may be returned (e.g., "user not found") identifying the error and web services processing may terminate. If the request is confirmed to be from a valid user of an active subscriber account, then web services processing continues with block 720.

At block 720, the fax destination is identified. In one embodiment, Internet fax system users may direct faxes to one or more desired fax destination via API gateway 240 by specifying the destination(s) in the POST request. If a valid destination is not found within the POST request, then an error message identifying the error (e.g., "no valid fax destination") may be returned and web services processing may terminate. If one or more valid fax destinations are identified within the POST request, then web services processing continues with block 730.

At block 730, parameters, fax settings and attachments are gathered. In one embodiment, parameters, such as the file(s) or URL(s) to fax, the recipient name and optional parameters, such as priority (low or high), caller ID, resolution, contrast algorithm, notification preference (e.g., via URL or email) and tagline name and number, may be identified in the POST request. If one or more URLs are specified as the content of the fax, then the content of the URLs are downloaded and stored as a file to fax. Any non-URL files included within the POST request are base64 decoded. If no valid files are associated with the POST request, then an error message identifying the error (e.g., "no files to fax) may be returned and web services processing may terminate. If one or more valid files are associated with the POST request, then web services processing continues with block 740.

At block 740, the files to be faxed are stored in file store 260, for example.

At block 750, fax details are stored to data store 265, for example. Fax details may include one or more of the following:
Sending user ID
Sending Account ID
Destination
Locations of files to fax
Optional parameters from the POST request In one embodiment, responsive to the fax details storage request, data store 265 returns to API gateway 240 a unique ID (e.g., a job ID of 1 to n digits) to be associated with this particular outbound fax job. As described above with respect to web and email gateway processing, the job ID may be based on an auto-incremented unique primary key. In one embodiment, the job ID is returned to the source of the POST request.

At block 760, an imaging system selection process is performed. According to one embodiment, imaging system selection processing is as described with reference to FIG. 8.

Figure 8:
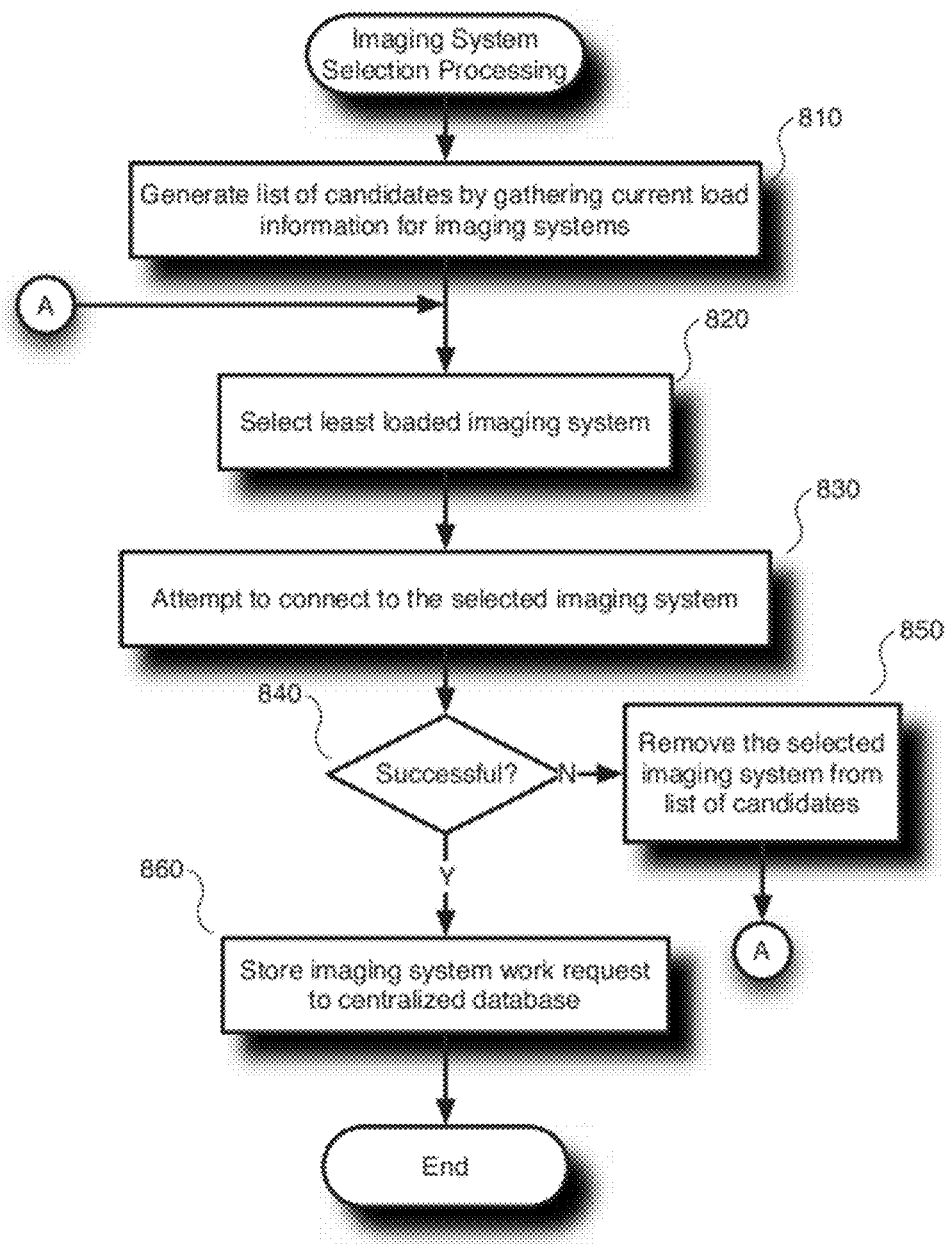
FIG. 8 is a flowchart illustrating imaging system selection processing in accordance with an embodiment of the present invention.

FIG. 8 is a flowchart illustrating imaging system selection processing in accordance with an embodiment of the present invention. At block 810, a list of candidates is generated by gathering current load information for imaging systems (e.g., imaging systems 250). In one embodiment, the current load information for the imaging systems is periodically calculated and reported by the individual imaging systems and stored in data store 265 as described further below with reference to FIG. 10. In such an embodiment, the current load information is gathered by requesting the most recently reported load information from data store 265. Various alternative methods for gathering current load information will be understood by those of ordinary skill in the art. For example, the initial submission device (e.g., email gateway 220, web gateway 230 or API gateway 240) to which the outbound fax request was made may poll the imaging systems directly for their current load information at the time when such information is needed.

At block 820, the least loaded imaging system is selected. Depending upon the particular load score computation, the least loaded imaging system may be associated with the lowest load score or the highest load score. In the exemplary load score calculation processing described below with reference to FIG. 10, the least loaded imaging system is the one having the lowest load score.

At block 830, an attempt is made to connect to the selected imaging system. According to one embodiment, the initial submission device (e.g., email gateway 220, web gateway 230 or API gateway 240) to which the outbound fax request was made and which is currently performing the imaging system selection processing attempts to make an HTTP connection to the selected imaging system. Those skilled in the art will appreciate various acknowledgement mechanisms can be employed for the selected imaging system to confirm to the initial submission device that it is able to accept and process a work request. In one embodiment, the imaging systems are configured to echo back the job ID passed on the connection if they are up and working.

At decision block 840, a determination is made regarding whether the connection attempt was successful. According to one embodiment, this determination is made based on whether the selected imaging system echoes back the job ID to the initial submission device via the HTTP connection. If the connection attempt was unsuccessful, then process branches to block 850; otherwise, imaging system selection processing continues with block 860.

At block 850, the selected imaging system is removed from the list of candidates and a new imaging system is selected by looping back to block 820.

At block 860, the imaging system work request is stored in the centralized message/work queue within data store 265, for example, and imaging system selection processing is complete. In one embodiment, the work request contains information identifying the selected imaging system that should process the work request.

In one embodiment, the initial submission device may update the load information associated with the selected imaging system to reflect the newly assigned work request. In this manner, to the extent subsequent imaging system selection processing occurs before the load score calculation cycle is able to update the load score for the selected imaging system, the subsequent imaging system selection processing will still have the benefit of access to load information for the selected imaging system that more accurately reflects its soon to be currently effective load, thereby preventing work requests from being assigned to the selected imaging system based on an out-of-date load score.

Figure 9:
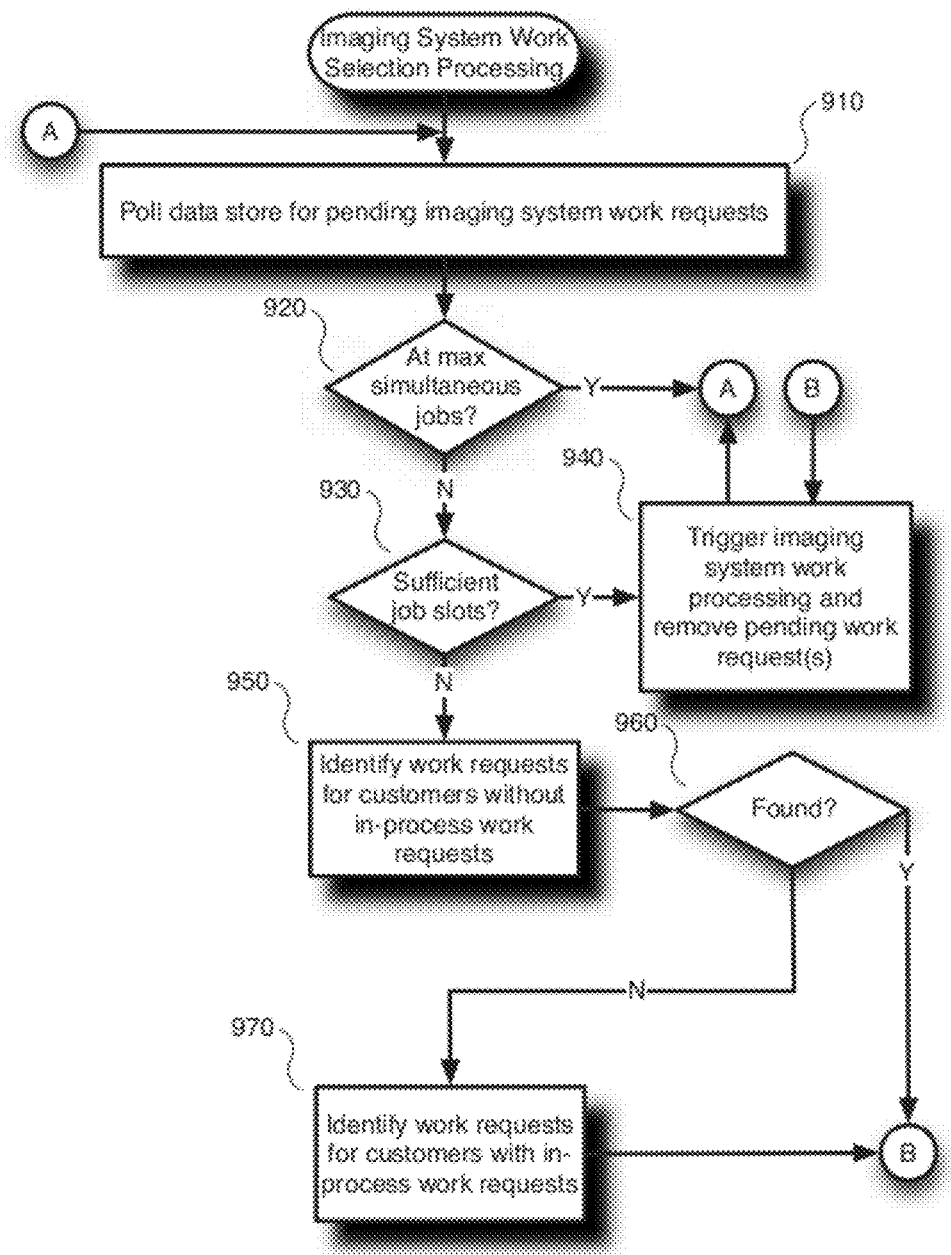
FIG. 9 is a flowchart illustrating imaging system work selection in accordance with an embodiment of the present invention.

FIG. 9 is a flowchart illustrating imaging system work selection in accordance with an embodiment of the present invention. According to one embodiment, a daemon running on each of the imaging systems performs work selection to determine a work processing order that promotes fairness among subscribers and avoids starvation under heavy work loads. In one embodiment, each imaging system has a configured level of simultaneous processing capability (e.g., between 2 and 5 simultaneous jobs, such as 3 jobs) and implements a "fair queue" to provide a unique "slot" per customer among its available work slots. Multiple slots can be used by a particular subscriber (subject to subscribed capacity limitations) if slots remain available and there are not other subscriber requests competing over such slots.

For simplicity and sake of brevity, FIG. 9 illustrates processing performed by a single imaging system in connection with work selection. It is to be understood that multiple imaging systems may be concurrently performing such processing.

At block 910, the imaging system at issue polls data store 265 for pending imaging system work requests. In one embodiment, the imaging system work requests are stored in a centralized message/work queue within data store 265. Thus, in response to the polling request, data store 265 may return only those work requests from the centralized message/work queue that identify the imaging system at issue as the one selected for processing the corresponding work request. Those of skill in the art will appreciate there are numerous mechanisms that can be used to trigger the polling cycle described herein. For example, the polling cycle may be triggered responsive to expiration of a configurable timer (e.g., every 5 seconds), upon the availability of one or more job slots, upon the completion of one or more job slots or the like.

At decision block 920, the imaging system determines if it is currently running a maximum number of simultaneous jobs. In one embodiment, this involves retrieving the configured simultaneous maximum jobs allowed to be performed by the imaging system (e.g., the number of total job "slots" the imaging system has) and subtracting from this the number of jobs currently being processed. If the imaging system is currently processing at its maximum number of simultaneous jobs (i.e., all job slots are allocated), then imaging system work selection processing loops back to block 910. If one or more job slots are available, then imaging system work selection processing continues with decision block 930.

At decision block 930, a determination is made regarding whether sufficient job slots are available to process all of the pending imaging system work requests for the imaging system. If not, then the fairness aspects kick in and imaging system work selection processing branches to block 950; otherwise, processing continues with block 940.

At block 940, it has been determined that sufficient job slots are available to process all pending job requests for the imaging system, so all of these pending job requests are removed from the centralized message/work queue and imaging system work processing is triggered.

At block 950, it has been determined that insufficient job slots are available to process all pending job requests for the imaging system, so work requests for customers without in-process work requests are identified. According to one embodiment, this involves building a list of customers for whom jobs are currently processing and then checking for work for customers other than those on the list on a first-in-first-out basis.

At decision block 960, a determination is made regarding whether work requests exist for customers for which jobs are not already in-process on the imaging system. If such jobs are found, then imaging system work selection processing continues with block 940; otherwise processing branches to block 970.

At block 970, work requests for customers with in-process work requests are identified. According to one embodiment, this identification of work requests is performed on a first-in-first-out basis and may be limited by a number of concurrent jobs allowed pursuant to the customer's subscription plan with the Internet fax system. After appropriate work requests have been identified, imaging system work selection processing continues with block 940.

Figure 10:
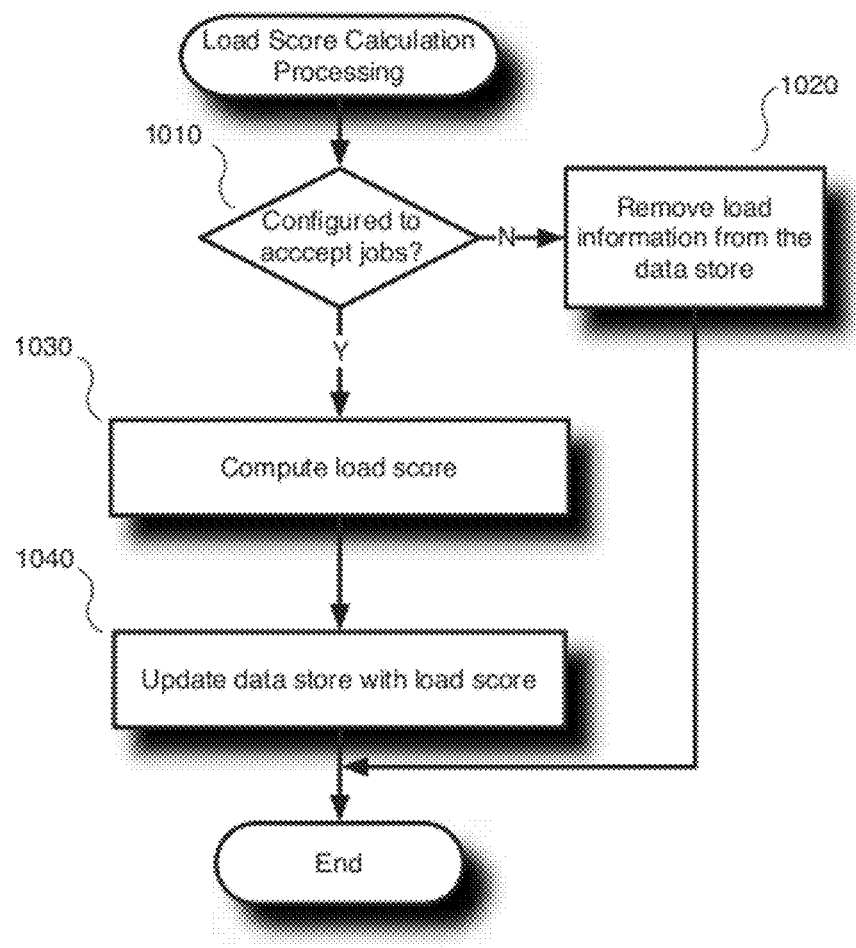
FIG. 10 is a flowchart illustrating load score calculation processing in accordance with an embodiment of the present invention.

FIG. 10 is a flowchart illustrating load score calculation processing in accordance with an embodiment of the present invention. For simplicity and sake of brevity, FIG. 10 illustrates one cycle of load score calculation processing performed by a single imaging system in connection with load score calculation processing. It is to be understood that all imaging systems may be concurrently performing such processing and that such processing may be periodically triggered as a result of expiration of a timer (e.g., every 5 to 10 seconds) or responsive to some other event in the Internet fax system (e.g., a request for load information from an initial submission device, completion of a job or the like).

At decision block 1010, the imaging system determines whether it is configured to accept jobs. This determination may be performed with reference to configuration information set by an administrator of the Internet fax system, for example. According to one embodiment, an imaging system is configured not to select jobs by creating a flag file (e.g., /tmp/oor) on the imaging system to communicate to the imaging system that it is out of rotation. If the imaging system is currently configured to accept jobs, then the load score calculation processing continues with block 1030. If the imaging system is not currently configured to accept jobs, then the load score calculation processing branches to block 1020.

At block 1020, this imaging system is removed from consideration for work assignment. In one embodiment, any existing load information for this imaging system is removed from data store 265 to preclude assignment of imaging work to this imaging system. Alternatively, the load score for this imaging system may be set to a value, such as the highest load score, to indicate this imaging system's unavailability to process work requests. Load score calculation processing is then terminated until the next load score calculation processing cycle is triggered.

At block 1030, the load score for this imaging system is calculated. In one embodiment, the load score is based on the number of jobs currently in-process on the imaging system, the current CPU load and the amount of memory currently in use. According to one embodiment, the load score is calculated in accordance with the following equation:

$$A \times (\text{number of jobs pending}) + B \times (\text{CPU load}) + C \times (\text{megabytes of memory used})$$

where,
A is a constant value between 0.5 and 5 (e.g., 1).
B is a constant value between 5 and 20 (e.g., 10).
C is a constant value between 0 and 1 (e.g., 0.01).
Those skilled in the art will appreciate various alternative calculations can be used. For example, the constants A, B and/or C can be adjusted as appropriate to suit a particular implementation or imaging system configuration.

At block 1040, the imaging system updates data store 265 with the newly calculated load score. Notably, while the present example is described assuming each imaging system gathers load information (e.g., jobs pending, CPU load and memory used), in alternative embodiments, a process external to the imaging systems may be provided with access to load information and may perform the actual load score calculation processing and/or reporting to data store 265 on behalf of the imaging systems.

Figure 11:
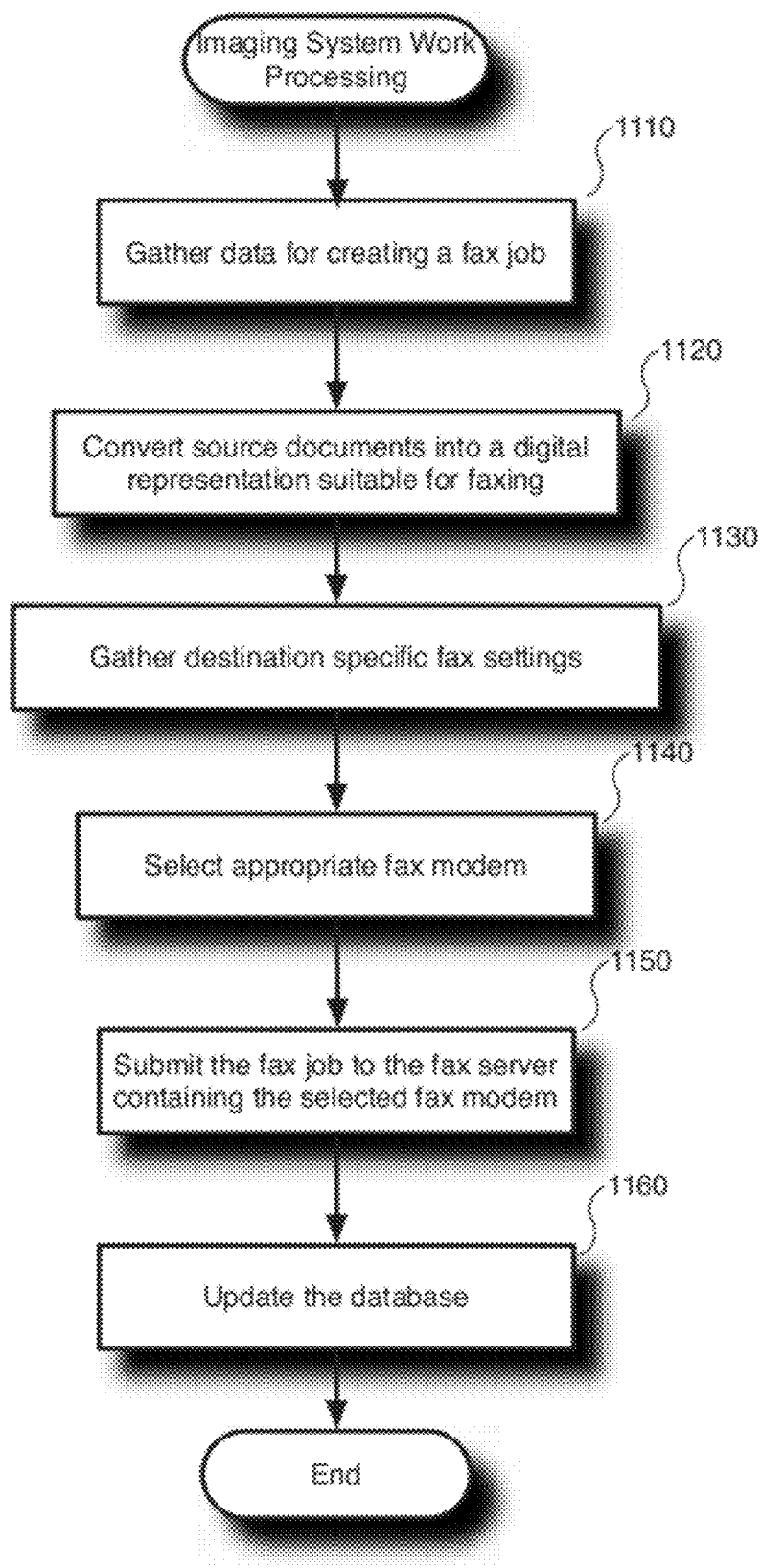
FIG. 11 is a flowchart illustrating imaging system work processing in accordance with an embodiment of the present invention.

FIG. 11 is a flowchart illustrating imaging system work processing in accordance with an embodiment of the present invention. At block 1110, data is gathered for creating a fax job. According to one embodiment, this involves gathering command-line arguments (e.g., job ID and an optional caller ID), identifying the customer associated with the job and job-specific parameters from the database (e.g., data store 265) and gathering customer outgoing fax settings from the database, some of which may be potentially overridden by the job-specific parameters. In one embodiment, the customer outgoing fax settings include one or more of the following:
  Notification setting (e.g., email, API push, web or API poll)
  Sending user
  Tagline name and number to use
  Tagline time zone to use for timestamp on fax
  Generate fax TSI to use from tagline number
  Resolution to image at (e.g., low, fine or hyperfine)
  Number of retries to perform
  Contrast enhancement algorithm to use (the Internet fax system may implement multiple contrast enhancement algorithms, e.g., a default algorithm, a darkening algorithm, etc.
  Custom email notification parameters (from address, subject and body templates), if any
  Maximum queue time for this fax In one embodiment, the destination number may be checked against disallowed numbers. For example, system-wide and/or customer-specific blacklists (do not fax list) may be maintained and enforced to prevent calls to certain numbers (e.g., 911, 411, etc.). In such an embodiment, if the destination is on one of the do not fax lists, then an error message will be communicated to the user according to the notification settings and imaging system work processing is terminated.

At block 1120, the source documents are converted into a digital representation suitable for faxing. In one embodiment, this involves converting the source documents into a single multi-page TIFF using the resolution and contrast enhancement as previously identified. If the conversion is unsuccessful, then an error message will be communicated to the user according to the notification settings and imaging system work processing is terminated. If the conversion is successful, then processing continues with block 1130.

At block 1130, destination-specific fax settings, if any, are gathered. According to one embodiment destination-specific fax settings are gathered from the database (e.g., data store 265) and include one or more of the following:
  Maximum speed
  Fax protocol class to use (e.g., 1, 1.0, 2.0 or 2.1)
  Enable or disable error correction mode (ECM)

At block 1140, an appropriate fax modem of available fax processing resources (e.g., fax processing resources 280) is selected. According to one embodiment, the available fax processing resources are filtered to produce an initial candidate list based on the ability of the modems to meet the desired capabilities (e.g., the destination-specific fax settings previously identified). From the initial candidate list, the list of potential fax modems to use to transmit the call is further refined based on whether the customer is at or above its subscribed capacity. If the customer is at or above capacity, then the lines currently being used are selected; otherwise, the least used (or first unused) line found in the database is selected.

At block 1150, the fax job is submitted to the fax server containing the selected fax modem. According to one embodiment, submitting includes sending the following information to the fax server:
  Destination number
  A TIFF image file to fax
  Tagline name and number to use
  Time zone to use on the tagline
  Number of retries to attempt
  TSI (the fax identifier on the call) to use
  Format of the tagline
  Sending customer account number
  Maximum time the fax may be in the queue
  The specific fax modem to use
  Modem capabilities to use (as identified previously in connection with gathering destination-specific fax settings)

If submission is successful (e.g., the fax server returns a unique communication ID to the image server), then imaging system work processing continues with block 1160. If submission is unsuccessful, then an error message may be communicated to the user according to the notification settings and imaging system work processing may terminate; however, in an embodiment in which a configurable number of retries may be attempted upon unsuccessful submission, imaging system work processing may continue by excluding the previously selected fax modem from the list of potential fax modems and looping back to block 1140 until submission is successful or the number of retires is exhausted.

At block 1160, the database is updated to reflect successful submission. In one embodiment, updating the database includes updating a counter in the database to reflect the customer has a job in progress on the selected fax modem and updating the outgoing fax job with one or more of the following:

- The fax server communication ID returned by the fax server upon successful submission
- The number of pages in the single multi-page TIFF file submitted
- The caller ID to use if such optional caller ID information was previously available during the gathering process of block 1110
- An indication of an "In Queue" state (which allows API and web retrieval to show the fax is currently in queue and waiting to be sent)

Figure 12:
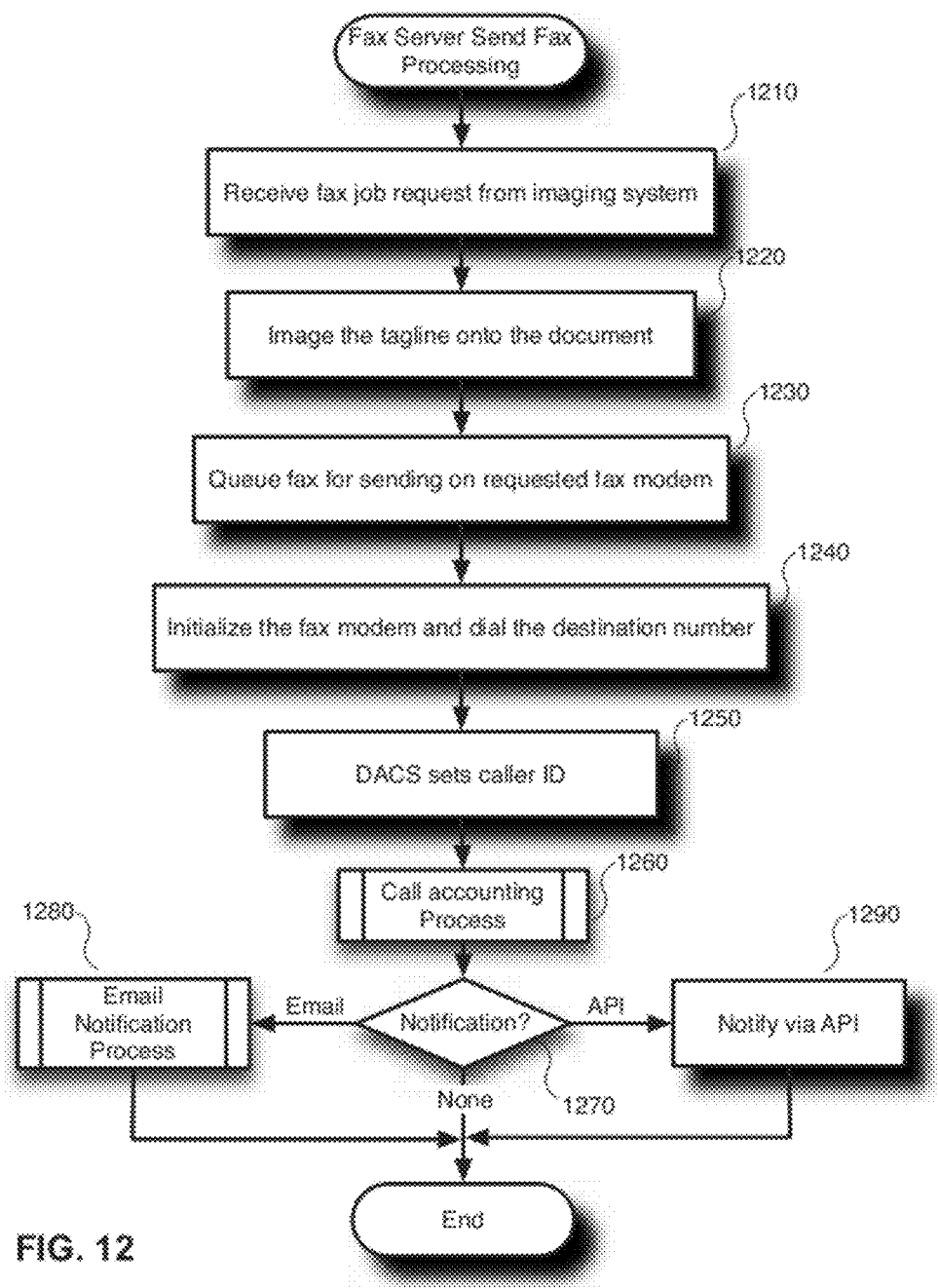
FIG. 12 is a flowchart illustrating fax server send fax processing in accordance with an embodiment of the present invention.

FIG. 12 is a flowchart illustrating fax server send fax processing in accordance with an embodiment of the present invention. At block 1210, a fax server receives a fax job request from an imaging system and returns a unique communication ID to the imaging system.

At block 1220, the fax server images the tagline on to the document according to the received parameters.

At block 1230, the fax server queues the fax for sending on the requested fax modem.

At block 1240, when this fax comes up in the queue, the fax modem is initialized with the requesting capabilities and the destination number is dialed.

At block 1250, a DACS, connected via a POTS line to the fax modem, writes information into the caller ID field to allow an upstream PBX to identify the modem/port originating the fax call. According to one embodiment, the DACS sets the caller ID field based on a static number assignment mechanism that forms a one-to-one association between an extension and a particular modem/port and then forwards the call to a PBX attached via T1/PRI. In one embodiment, each PBX of the Internet fax system architecture is associated with one or more DACS each having 24 fax ports and each fax server is connected to multiple ports of a DACS and the extensions have the following format:

303303DDFF

Where:
the first six digits (i.e., 303303) are hard-coded
DD represents the DACS with which the fax server is associated
FF represents the port to which the fax modem on the fax server is connected the DACS to which the fax server is connected.

Following the above convention (or variations thereof) for associating a static number with a modem/port, the PBX receiving the fax call may use the caller ID information passed to it to identify the specific fax modem on the specific fax server and may use that information to interrogate the fax server for desired information as described further below with reference to FIG. 13.

If the fax call is successful, then fax server send fax processing continues with block 1260. If the fax call is unsuccessful, then a configurable number of carrier retries may be attempted by recording the number of attempts and causing the PBX to retry with an alternate carrier if the failure reason is one eligible for an alternate carrier retry (e.g., disconnected, no carrier or busy) or retry with the same carrier if the failure reasons is not one eligible for trying an alternate by looping back to block 1230. After the retries have been exhausted, processing continues with block 1260.

In some embodiments, a notify process may be performed at this point of fax server send fax processing (regardless of the success or failure of the fax call) to record the location of the file (attempted to be) faxed, a success/failure indicator, transmission time, communications ID, sending account ID and number of pages transmitted. This information may be used later in combination with additional information to provide a detailed outbound fax confirmation to the user via their configured notification method (e.g., email or API notification). In one embodiment, regardless of the configured notification method (e.g., even if it is "none"), the database is updated so that web-based status information is available to the customer via web retrieval through web gateway 230, for example.

At block 1260, a call accounting process is performed. According to one embodiment, the call accounting process is as described with reference to FIG. 15.

At decision block 1270, a determination is made regarding the type of notification, if any, to be performed in relation to the completed fax job. According to one embodiment, the notification type (e.g., email, API push to URL or none) for this outbound fax is first retrieved from the database. If the notification setting for this outbound fax is none, then fax server send fax processing is complete. If the notification setting for this outbound fax is email, then fax server send fax processing continues with block 1280; otherwise processing branches to block 1290.

At block 1280, an email notification process is performed. According to one embodiment, the email notification process is as described with reference to FIG. 16.

Figure 13:
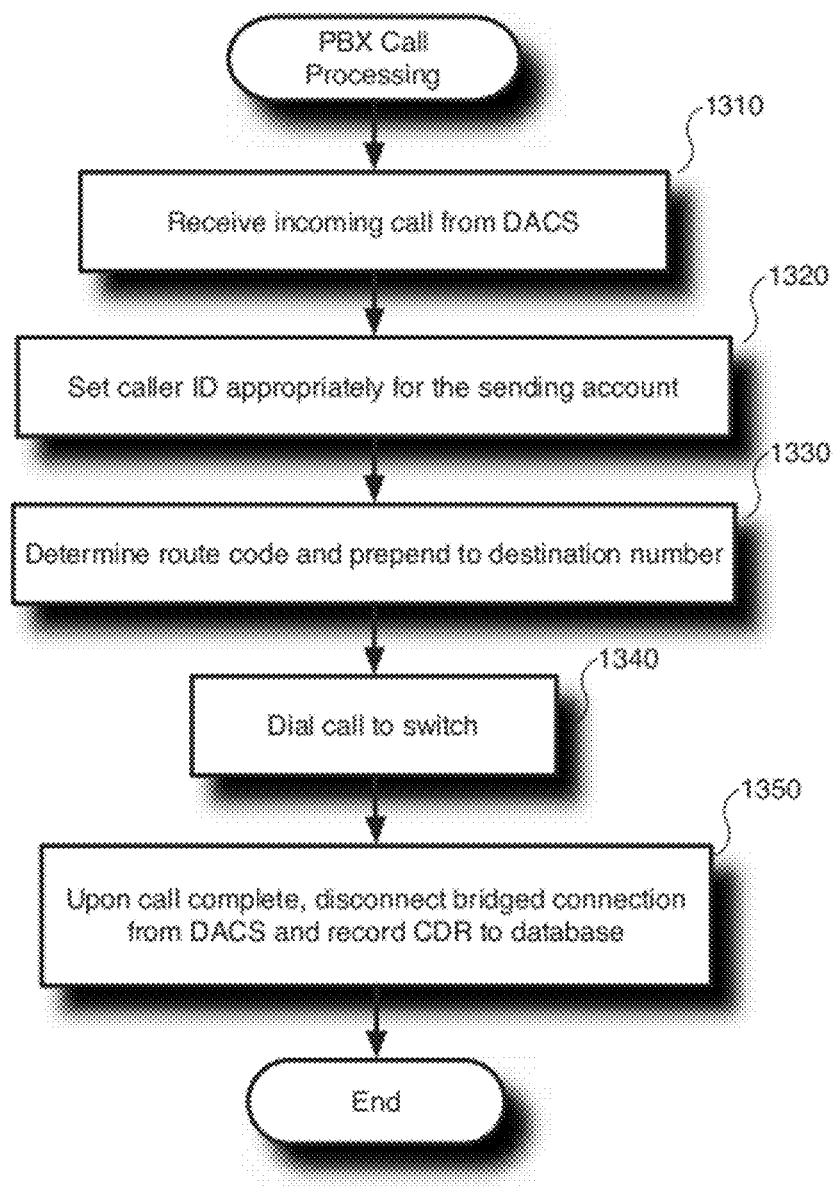
FIG. 13 is a flowchart illustrating private branch exchange (PBX) call processing in accordance with an embodiment of the present invention.

At block 1290, the user is notified regarding the completed fax job via API. According to one embodiment, the URL (originally recorded by API gateway 240) to which the notification is to be pushed is retrieved from the database. The following data may then be POSTed to the specified URL and fax server send fax processing is complete:

Fax job ID
Communications ID
Destination name
Destination number
Success/failure
Detailed reason (if failure)
Time sent
Time completed
Call duration
Total number of pages
Number of pages transmitted FIG. 13 is a flowchart illustrating PBX call processing in accordance with an embodiment of the present invention. At block 1310, a PBX, logically interposed between fax processing resources 280 and telecom system(s) 290, receives an incoming call from DACS (representing the outbound fax call).

At block 1320, the caller ID field is set appropriately for the sending account. According to one embodiment, the caller ID field is set with either a default caller ID associated with the subscriber account or a caller ID associated with this communications ID, if specified.

As noted above with reference to FIG. 12, in one embodiment, the caller ID field communicated to the PBX may contain extension information according to a static number assignment mechanism that forms a one-to-one association between an extension and a particular fax modem/DACS port. This allows the PBX to identify the fax server originating the outbound fax call, make an IP connection to the fax server and interrogate the fax server for the communications ID of the fax job being sent by the fax modem identified by the caller ID field.

Using the communications ID, the PBX may then query the database to identify the sending subscriber account ID that initiated the communications ID and can retrieve the default caller ID associated with the subscriber account ID. This caller ID will be written to the caller ID field unless overridden by a particular caller ID value specified by the user to be associated with this outbound fax call in which case the caller ID field will be set with the call-specific caller ID value.

At block 1330, a route code is prepended to the destination number. According to one embodiment, the database is checked to determine if a destination-specific route code exists. In one embodiment, the first match of the following takes precedence:
- A route code associated with the full number (e.g., all ten digits of the destination number)
- A route code associated with the NPANXX (e.g., the first six digits of the destination number)
- A route code associated with the NPA (a/k/a area code, the first three digits of the destination number)
- A default route code In one embodiment, if a default route code is to be used, then the database carrier rate tables are queried to determine the lowest cost route code based on NPANXX of the destination number.

In an implementation that allows carrier retries, the current route code may be overridden. According to one embodiment after the route code has been determined based on the foregoing criteria, the database is queried to determine if the current fax call is a retry attempt wherein an alternate carrier has been requested by the fax server. If so, then the current route code is overridden with an alternate carrier route code different from that used in the prior fax call attempt.

In alternative embodiments, the order of route code determination described above may be reordered so as to first identify whether the current fax call is a retry attempt and if so identifying the alternate carrier route code; otherwise applying the destination-specific route code matching algorithm noted above.

In any event, after the route code is determined, it is prepended to the destination number to cause a switch of telecom system(s) 290, for example, to select an appropriate trunk for the outbound fax call.

At this point in PBX call processing, the PBX may internally mark this call (for call detail record (CDR)) with one or both of the following:
- The account code of the account ID previously gathered
- A user field specifying the communication ID and fax modem that initiated the call At block 1340, the outbound fax call is dialed to the switch via a T1/PRI connection with the caller ID and destination as set based on the foregoing PBX call processing steps.

At block 1350, the PBX waits for the call to complete (e.g., switch disconnect). Upon call completion, the PBX disconnects the bridged connection from the DACS, records the CDR to the database and PBX call processing is terminated.

Figure 14:
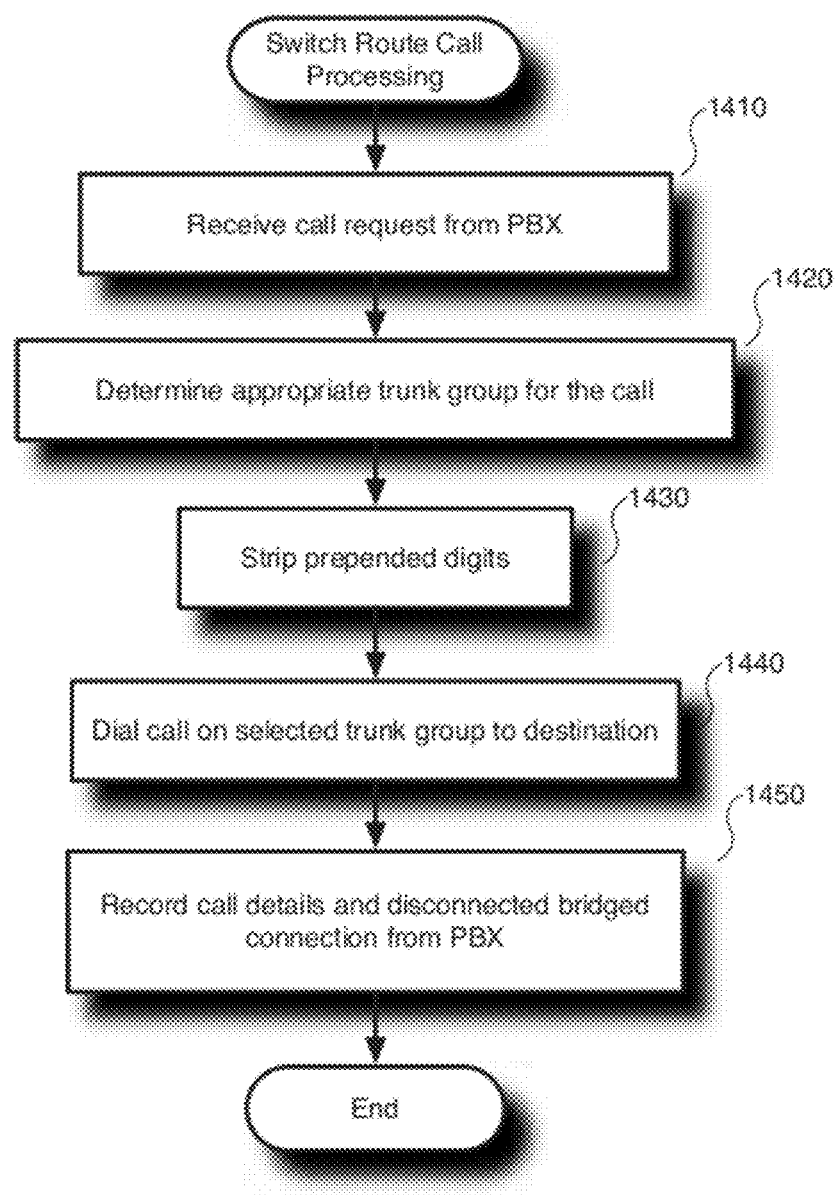
FIG. 14 is a flowchart illustrating switch route call processing in accordance with an embodiment of the present invention.

FIG. 14 is a flowchart illustrating switch route call processing in accordance with an embodiment of the present invention. At block 1410, a call request representing an outbound fax call is received from a PBX.

At block 1420, an appropriate trunk group is determined for the call. Trunk groups may provide a transmission channel to a packet-switched network (e.g., the Internet) or a circuit-switched network (e.g., the PSTN). According to one embodiment, the destination number of the call request (which includes the route code digits prepended by the PBX) is pattern-matched against trunk groups (e.g., T1/PRI, DS3, Session Initiation Protocol (SIP) and the like) attached to the switch with the most specific match taking precedence.

At block 1430, the prepended digits are stripped to arrive at an appropriate number of digits to dial (e.g., the right-most 10, 11, 7, etc.) according to the configuration of the selected trunk group.

At block 1440, the call is dialed on the selected trunk group to the destination.

At block 1450, upon call completion, call details are recorded, the bridged connection from the PBX is disconnected and switch route call processing is terminated.

Figure 15:
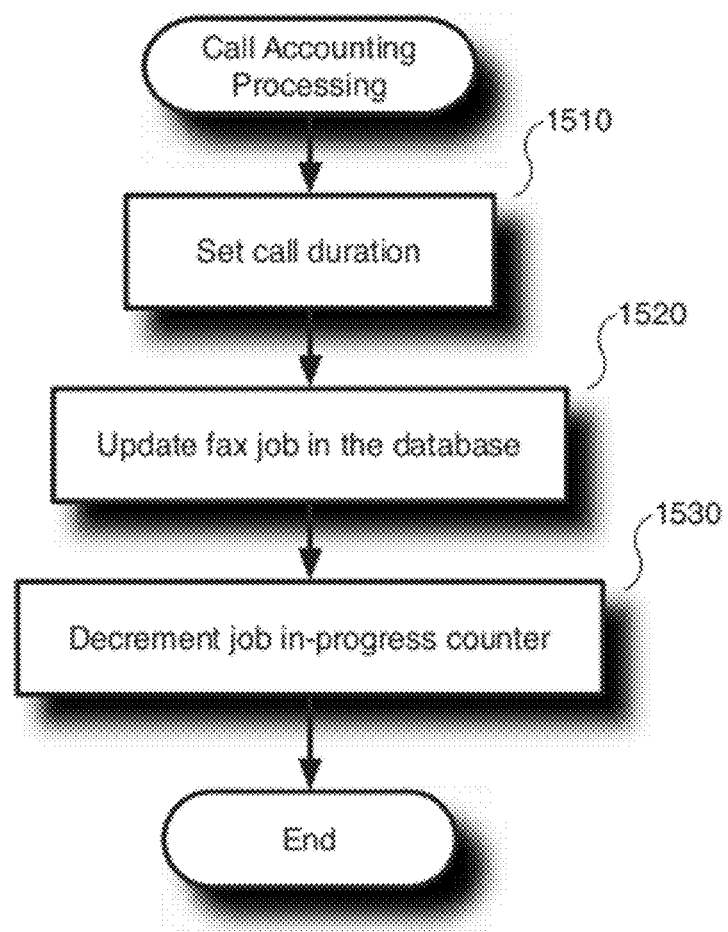
FIG. 15 is a flowchart illustrating call accounting processing in accordance with an embodiment of the present invention.

FIG. 15 is a flowchart illustrating call accounting processing in accordance with an embodiment of the present invention. At block 1510, the call duration for the outbound fax call is set. According to one embodiment the database is first queried for a CDR associated with the destination and sending account ID to obtain actual call duration. If the CDR is found, then the actual call duration is used; otherwise the transmit time is used as the call duration.

At block 1520, the fax job is updated in the database. According to one embodiment, the fax job ID is first looked up in the database based on the communication ID, account ID and "in queue" state. Then, the fax job record is updated in the database to indicate success or failure and a detailed reason for the failure is added in the case of a failure. The number of pages transmitted may also be added to the fax job record.

At block 1530, the appropriate job in-progress counter is decremented. According to one embodiment, a job in-progress counter is maintained in the database for each fax modem by customer. In some embodiments, this counter is used during imaging system work processing to select an appropriate fax modem (see, e.g., FIG. 11 and block 1140).

Figure 16:
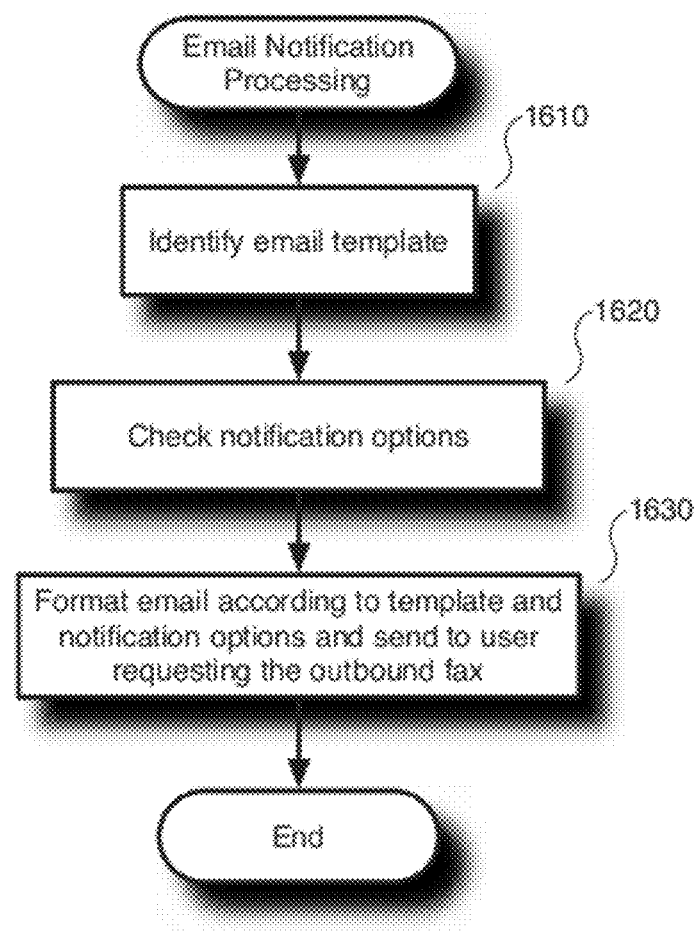
FIG. 16 is a flowchart illustrating email notification processing in accordance with an embodiment of the present invention.

FIG. 16 is a flowchart illustrating email notification processing in accordance with an embodiment of the present invention. At block 1610, an email notification template is identified that is to be used for email notifications to the user. According to one embodiment, the database is queried to locate a custom email notification template for the subscriber account. The custom email notification template may define custom messaging for use in connection with the subject line and/or body of the email notification. If a custom template is not specified for the subscriber account, then a default email notification template may be used.

At block 1620, notification options are checked. According to one embodiment, notification options include whether to include a transmittal page and whether to include the original email fax request subject line. Those skilled in the art will appreciate various other options are possible. For example, the subscriber may specify email notifications are to be in plain text format versus HTML and that the transmittal page and/or the scaled image of the first page are to be sent as attachments versus inline images.

If a transmittal page is to be included with email notifications for this subscriber account, then a transmittal page is generated including one or more of the following:
- Destination
- Call status (success/failure, detailed reason if failure)
- Number of pages transmitted
- Date/time in user's specified time zone
- Call duration
- Scaled image of the first page of the file faxed If the subject line from the email fax request that initiated this fax job is to be included, then the subject for this job ID is retrieved from the database (which was recorded earlier by the email gateway 220, for example).

At block 1630, the email notification is formatted according to the identified template and notification options and sent to the user that originated the email fax request for this fax job.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of delivering fax messages, the method comprising:
   receiving, at an initial submission gateway device of an Internet fax system, a request to deliver a fax message to one or more third parties;
   storing, by the initial submission gateway device, one or more source files associated with the request and representing at least a portion of content to be included as part of the fax message to a shared storage area of the Internet fax system accessible by a plurality of imaging systems and a plurality of fax processing resources of the Internet fax system;
   selecting, by the initial submission gateway device, an imaging system of the plurality of imaging systems to convert the one or more source files into a digital representation suitable for faxing;
   storing, by the initial submission gateway device, a work request on a centralized work queue within a database of the Internet fax system accessible by the plurality of imaging systems, the work request containing information identifying the selected imaging system;
   polling, by the selected imaging system, the centralized work queue to identify whether any pending work requests exist for the selected imaging system;
   responsive to identifying the work request, converting, by the selected imaging system, the one or more source files into the digital representation, associating the digital representation with an outbound fax job and causing the fax message to be delivered to the one or more third parties by submitting the outbound fax job to a fax modem of the plurality of fax processing resources;
   determining, by a private branch exchange (PBX), whether a specific caller ID number has been requested for the outbound fax job; and
   if said determining so indicates, then presenting the specific caller ID number on an outgoing call leg of a call conveying the fax message to a third party of the one or more third parties.

2. The method of claim 1, further comprising prior to said storing, by the initial submission gateway device, one or more source files associated with the request, validating that the request has been submitted by a valid and active user account associated with a valid and active subscriber account of the Internet fax server.

3. The method of claim 1, further comprising selecting the fax modem based on subscribed capacity of simultaneous outbound fax jobs associated with the subscriber account.

4. The method of claim 3, wherein said selecting the fax modem based on subscribed capacity comprises, if the subscriber account is below the subscribed capacity, then selecting the fax modem as a result of the fax modem having a least number of jobs pending amongst all fax modems of the plurality of fax processing resources.

5. The method of claim 3, wherein said selecting the fax modem based on subscribed capacity comprises, if the subscriber account is already at the subscribed capacity, then selecting the fax modem as a result of the fax modem having a least number of jobs pending amongst fax modems of the plurality of fax processing resources that are currently processing a prior outbound fax job associated with the subscriber account.

6. The method of claim 1, further comprising:
   for each of the plurality of imaging systems:
      calculating, by the imaging system, a load score based on one or more of a number of jobs pending on the imaging system, a processor load associated with the imaging system and an amount of memory associated with the imaging system that is currently being used; and
      causing, by the imaging system, the load score to be made available to the initial submission gateway device; and
   wherein said selecting, by the initial submission gateway device, an imaging system of the plurality of imaging systems to convert the one or more source files into a digital representation suitable for faxing comprises selecting a least loaded of the plurality of imaging systems, based on their respective load scores.

7. The method of claim 6, further comprising ensuring equal access by a plurality of subscribers of the Internet fax system to a plurality of simultaneous job slots provided within each of the plurality of imaging systems, by favoring for assignment to an available job slot of the plurality of simultaneous job slots those of the pending work requests, by a particular imaging system of the plurality of imaging systems, that are associated with a subscriber other than one for which the particular imaging system is currently processing.

8. The method of claim 1, further comprising causing a fax server with which the fax modem is associated to configure one or more fax capabilities based on a destination number associated with the outbound fax job.

9. A method of delivering fax messages, the method comprising:
   for each of a plurality of imaging systems of an Internet fax system:
      calculating, by the imaging system, a load score based on one or more of a number of jobs pending on the imaging system, a processor load associated with the imaging system and an amount of memory associated with the imaging system that is currently being used; and
      causing, by the imaging system, the load score to be made available to a plurality of initial submission gateway devices of the Internet fax system;
   responsive to receiving, at an initial submission gateway device of the plurality of initial submission gateway devices, a request to deliver a fax message to one or more third parties:
      selecting, by the initial submission gateway device, a least loaded of the plurality of imaging systems, based on their respective load scores, to convert one or more source files associated with the request and representing at least a portion of content to be included as part of the fax message into a digital representation suitable for faxing; and
      associating, by the selected imaging system, the digital representation with an outbound fax job and causing the fax message to be delivered to the one or more third parties by submitting the outbound fax job to a fax modem of a plurality of fax processing resources of the Internet fax system;

determining, by a private branch exchange (PBX), whether a specific caller ID number has been requested for the outbound fax job; and if said determining so indicates, then presenting the specific caller ID number on an outgoing call leg of a call conveying the fax message to a third party of the one or more third parties.

10. The method of claim 9, further comprising prior to said selecting, by the initial submission gateway device, a least loaded of the plurality of imaging systems, validating that the request has been submitted by a valid and active user account associated with a valid and active subscriber account of the Internet fax server.

11. The method of claim 9, further comprising selecting the fax modem based on subscribed capacity of simultaneous outbound fax jobs associated with the subscriber account.

12. The method of claim 9, further comprising ensuring equal access by a plurality of subscribers of the Internet fax system to a plurality of simultaneous job slots provided within each of the plurality of imaging systems, by favoring for assignment to an available job slot of the plurality of simultaneous job slots pending work requests, by a particular imaging system of the plurality of imaging systems, that are associated with a subscriber other than one for which the particular imaging system is currently processing.

13. A method of delivering fax messages, the method comprising:

responsive to receiving fax requests to deliver fax messages, at one or more initial submission gateway devices of an Internet fax system from a plurality of subscribers of the Internet fax system, generating, by the one or more initial submission gateway devices, work requests corresponding to the fax requests, the work requests each containing information identifying a selected imaging system of the plurality of imaging systems to convert one or more source files associated with the fax requests into digital representations suitable for faxing;

ensuring equal access by the plurality of subscribers to a plurality of simultaneous job slots provided within each of the plurality of imaging systems, by favoring for assignment to an available job slot of the plurality of simultaneous job slots those of the work requests, by a particular imaging system of the plurality of imaging systems, that are associated with a subscriber other than one for which the particular imaging system is currently processing;

after completing processing of work requests by the particular imaging system, associating the digital representations with outbound fax jobs and causing the fax messages to be delivered by submitting the outbound fax jobs to one or more fax modems of a plurality of fax processing resources of the Internet fax system;

determining, by a private branch exchange (PBX), whether specific caller ID numbers have been requested for the outbound fax jobs; and if said determining so indicates, then presenting the specific caller ID numbers on outgoing call legs of calls carrying the fax messages.

14. The method of claim 13, further comprising prior to said generating, by the one or more initial submission gateway devices, work requests corresponding to the fax requests, validating that the fax requests have been submitted by valid and active user accounts associated with valid and active subscriber accounts of the Internet fax server.

15. The method of claim 13, further comprising:

for each of the plurality of imaging systems:

calculating, by the imaging system, a load score based on one or more of a number of jobs pending on the imaging system, a processor load associated with the imaging system and an amount of memory associated with the imaging system that is currently being used; and causing, by the imaging system, the load score to be made available to the initial submission gateway device; and wherein the selected imaging system comprises a least loaded of the plurality of imaging systems, based on their respective load scores.

16. The method of claim 13, further comprising configuring one or more fax capabilities of the one or more fax modems based on destination numbers associated with the outbound fax jobs.

\* \* \* \* \*